US00RE43449E

(19) United States
(12) Reissued Patent
Yageta et al.

(10) Patent Number: US RE43,449 E
(45) Date of Reissued Patent: Jun. 5, 2012

(54) FILM PACKAGED BATTERY HAVING A CUPPED PORTION

(75) Inventors: Hiroshi Yageta, Tokyo (JP); Makihiro Otohata, Tokyo (JP); Nobuaki Yoshioka, Tokyo (JP)

(73) Assignee: NEC Corporation, Tokyo (JP)

(21) Appl. No.: 12/855,390

(22) Filed: Aug. 12, 2010

Related U.S. Patent Documents

Reissue of:
(64) Patent No.: 7,410,724
Issued: Aug. 12, 2008
Appl. No.: 11/488,669
Filed: Jul. 19, 2006

U.S. Applications:
(62) Division of application No. 10/233,614, filed on Sep. 4, 2002, now Pat. No. 7,105,248.

(30) Foreign Application Priority Data

Sep. 4, 2001 (JP) ..... 2001-267249
Jan. 22, 2002 (JP) ..... 2002-013243
Jul. 18, 2002 (JP) ..... 2002-209848

(51) Int. Cl.
*H01M 2/02* (2006.01)
*H01M 2/06* (2006.01)
*H01M 6/10* (2006.01)
*H01M 6/12* (2006.01)

(52) U.S. Cl. ..... 429/176; 429/133; 429/157; 429/181

(58) Field of Classification Search ..... 429/66, 429/94, 128, 133, 156, 157, 162, 176, 179, 429/181
See application file for complete search history.

(56) References Cited

U.S. PATENT DOCUMENTS 4,278,744 A * 7/1981 Athearn ..... 429/181
4,997,732 A * 3/1991 Austin et al. ..... 429/153
5,358,539 A * 10/1994 Dawson et al. ..... 29/623.2
5,419,982 A * 5/1995 Tura et al. ..... 429/162
6,268,078 B1 * 7/2001 Tuttle ..... 429/158
6,387,567 B1 * 5/2002 Noh ..... 429/211
6,524,741 B1 * 2/2003 Bryan ..... 429/61
6,713,209 B1 * 3/2004 Naskali ..... 429/57

FOREIGN PATENT DOCUMENTS

CN 1253388 A * 5/2000
EP 1 071 151 1/2001

(Continued)

OTHER PUBLICATIONS

IPDL Machine Translation of JP 2000-200584A (Jul. 2000).*

(Continued)

*Primary Examiner* — Gregg Cantelmo
(74) *Attorney, Agent, or Firm* — Young & Thompson

(57) ABSTRACT

A battery is fabricated on the basis of at least one of the following four concepts, i.e., lead terminals passing through a package not lower than the uppermost surface of an electrolyte cell, lead terminals projecting from a package in directions opposite to each other, a film package with a crushed portion expandable for accumulating gas and sheets of gas barrier sealant for keeping the boundaries between component parts of a package sealed; the seal is hardly broken so that the battery is durable and highly reliable.

20 Claims, 18 Drawing Sheets

FOREIGN PATENT DOCUMENTS

| | | | | |
|---|---|---|---|---|
| EP | 1071151 | A1 | * | 1/2001 |
| EP | 1 102 336 | | | 5/2001 |
| EP | 1102336 | A1 | * | 5/2001 |
| EP | 1104040 | A1 | * | 5/2001 |
| GB | 1 346 011 | | | 2/1974 |
| GB | 1346011 | | * | 2/1974 |
| JP | 62-064050 | | | 3/1987 |
| JP | 6-111799 | | | 4/1994 |
| JP | 06111799 | A | * | 4/1994 |
| JP | 10-55792 | | | 2/1998 |
| JP | 10055792 | A | * | 2/1998 |
| JP | 10241744 | A | * | 9/1998 |
| JP | 11-162443 | | | 6/1999 |
| JP | 11-260408 | | | 9/1999 |
| JP | 11260408 | A | * | 9/1999 |
| JP | 2000-048867 | | | 2/2000 |
| JP | 2000-100404 | | | 4/2000 |
| JP | 2000100404 | A | * | 4/2000 |
| JP | 2000-133216 | | | 5/2000 |
| JP | 2000133216 | A | * | 5/2000 |
| JP | 2000200584 | A | * | 7/2000 |
| JP | 2000-223086 | | | 8/2000 |
| JP | 2000311713 | A | * | 11/2000 |
| JP | 2000-353500 | | | 12/2000 |
| JP | 2000353500 | A | * | 12/2000 |
| JP | 2001-023702 | | | 1/2001 |
| JP | 2001-52659 | | | 2/2001 |
| JP | 2001052659 | A | * | 2/2001 |
| JP | 2001-84971 | | | 3/2001 |
| JP | 2001084971 | A | * | 3/2001 |
| JP | 1104040 | A1 | * | 5/2001 |
| JP | 2001-222986 | | | 8/2001 |
| JP | 2001222986 | A | * | 8/2001 |
| JP | 2003-157811 | | | 5/2003 |

OTHER PUBLICATIONS

Japanese Official Action—2002-209848—Sep. 28, 2010.

IPDL Machine Translation of JP 2000-200584A.*

Linden "Handbook of Batteries" 2nd ed, McGraw-Hill, Inc. 1995, p. 14.2.*

* cited by examiner

FILM PACKAGED BATTERY HAVING A CUPPED PORTION

Matter enclosed in heavy brackets [ ] appears in the original patent but forms no part of this reissue specification; matter printed in italics indicates the additions made by reissue.

FIELD OF THE INVENTION

This invention relates to a battery and, more particularly, to a battery of the type having a package for accommodating an electrolyte unit and a process for fabrication thereof.

DESCRIPTION OF THE RELATED ART

There are various sorts of battery-powered electric devices such as, for example, portable electric devices, electric cars, motorcycles bicycles and battery-powered systems such as uninterruptible power supply systems and distributed electric-power storage systems. Although these battery-powered electric devices/systems require different features of the batteries, high reliability and durability are required for all the batteries used in those sorts of battery-powered electric devices/systems.

The portable electric devices are getting smaller and smaller, and, accordingly, small lightweight batteries are required for the portable electric devices. Laminate film packages are preferable for the small lightweight. Metal foils and sealing layers of high molecular resin are laminated, and are formed in the laminate film packages. Electrolytic cells are enclosed in the laminate film packages, and are sealed therein by a heat sealing to the sealing layers. The sealing layers are made of resin in polyolefine series, and the heat sealing only requires 200 degrees in centigrade, which is much lower than the temperature required for the laser beam welding.

One of the attractive features of the laminate film packages is low cost and high productivity. The cost for the laminate film packaged battery is much lower than the cost for the batteries using the metal cans. While metal foils are shaped into the metal cans, lubricant oil is used in the process, and the metal cans are contaminated with the lubricant oil. For this reason, the metal cans are to be cleaned after the process, and a large amount of cleaning solution is consumed. The cleaning is one of the factors of the high production cost. The lubricant oil is not required for the laminate film packaged batteries. This is because of the fact that the high molecular resin layers are incorporated in the laminate film. The high molecular resin layers reduce the friction during the deep drawing and punching without the lubricant oil, and, accordingly, the cleaning is not required for the laminate film packaged batteries. Another factor of the high production cost is said complicated fabrication process. Yet another factor of the high production cost is low production yield. The electrolyte cell is to be sealed in the metal can. However, it is not easy to seal the electrolyte cell in the metal can by using a welding. Imperfect welding results in defective products, and is causative of the low production yield. On the other hand, the laminate film packaged batteries are fabricated through an in-line process. The laminate film is unwound from a roll, and is shaped into cups through a deep drawing. Electrolyte cells are put into the cups without the cleaning, and are sealed therein. The time consumed in the fabrication process is shortened, and the productivity is enhanced. The cleaning solution is not consumed, and the cost is reduced. Thus, the laminate film packaged batteries are economical rather than the batteries using the metal cans.

The laminate film packages are expected to be durable and highly reliable. The laminate film packages are to prevent the electrolyte cells from the outside air and to prohibit the electrolyte from leaking. In case where non-aqueous electrolyte is used in the electrolyte cells, the laminate film packages are hermetically to seal the electrolyte cells inside thereof, because the non-aqueous electrolyte is liable to be deteriorated due to the outside air. Several sorts of the laminate film packaged batteries have the electrolyte cells sealed in the laminate film packages in vacuum. If the seal is broken, the electrolyte is exposed to the outside air. Thus, the durability and high reliability are required for the laminate film packaged batteries.

Although the prior art laminate film package disclosed in Japanese Patent Application laid-open No. 2000-353500 includes sealing layers made of polyethylene terephthalate, the polyethylene sealing layers do not serve as good barriers against gas. Even though the electrolyte cell is sealed in the laminate film package as taught by the Japanese Patent Application laid-open, the outside air penetrates through the polyethylene terephthalate sealing layers, and the electrodes are liable to be separated from one another. This results in reduction in electromotive force.

The sealing layers of the prior art laminate film packages are made of synthetic resin in polyolefine series such as polyethylene, polypropylene and modified resin thereof. The reasons why the synthetic resin in the polyolefine series is used for the laminate film packages are that the synthetic resin in the polyolefine series serves as a barrier against gas and well withstands the non-aqueous electrolyte. However, the polyolefine resin is fused at or lower than 200 degrees in centigrade. In case where the laminate film packaged batteries are exposed to high temperature ambience higher than 200 degrees in centigrade, the seal is broken. Thus, the polyolefine sealing layers are improper from the viewpoint of the reliability.

As described hereinbefore, a typical example of the laminate film packaged battery comprises a laminate film package, a groups of electrodes or an electrolyte cell enclosed in the laminate film package and a pair of lead terminals connected to the electrolyte cell and projecting from the laminate film package to the outside thereof. The laminate film package is formed from sheets of laminate film, which includes metal layers and heat fusible synthetic resin layers, and the sheets of laminate film are partially spaced from one another so as to define an inner space. The electrolyte cell is provided in the inner space, and the lead terminals project from the sheets of laminate film. The sheets of laminate film are fusion bonded to each other, and the electrolyte cell is sealed in the laminate film package. For this reason, the laminate film packaged batteries are flat.

A prior art laminate film packaged battery is disclosed in Japanese Patent Application laid-open No. hei-10-55792. The prior art laminate film package battery has a laminate film package formed from sheets of the laminate film, and is flat. The laminate film package has a separable portion, i.e., the sheets of laminate film are not strongly bonded at the separable portion. Although any gas is not generated inside the laminate film package in so far as the electrolyte cell generates electric power on normal operating conditions, it is unavoidable that the electrolyte cell is put under abnormal operating conditions such as an extremely high temperature ambience or application of irregular high voltage. In these circumstances, gas is generated in the electrolyte cell. Even though the gas generated in the electrolyte cell is a little, the gas is sealed in the laminate film package. The electrolyte cell may repeatedly enter the abnormal ambience. The gas is accumulated inside the laminate film package, and the gas pressure is gradually increased. In this situation, the sheets of laminate film are separated at the separable portion, and the gas escapes through the opening. Thus, the separable portion prevents the laminate film package from explosion. The prior art laminate film packaged battery disclosed in the Japanese Patent Application laid-open is hereinbelow referred to as "first prior art".

Another prior art laminate film packaged battery is disclosed in Japanese Patent Application laid-open No. 2000-133216. The prior art laminate film package disclosed therein includes a sheet of laminate film containing aluminum foils, and the sheet of laminate film is formed with a rectangular parallelepiped recess. The rectangular parallelepiped recess is formed through a deep drawing. The electrolyte cell is snugly received in the rectangular parallelepiped recess so that clearance between the laminate film package and the electrolyte cell is minimized. The prior art laminate film packaged battery disclosed in the Japanese Patent Application laid-open is hereinbelow referred to as "second prior art".

Yet another prior art laminate film packaged battery is disclosed in Japanese Patent Application laid-open No. hei-11-260408. The unit cell is enclosed in the laminate film package, and the air is evacuated from the inner space after the enclosure. The laminate film package is pressed to the outer surfaces of the unit cell. Thus, the unit cell is hermetically sealed in the laminate film package. The prior art laminate film packaged battery disclosed in the Japanese Patent Application laid-open is hereinbelow referred to as "third prior art".

Still another prior art laminate film packaged battery is disclosed in Japanese Patent Application laid-open No. 2000-100404. The unit cell is sealed in a laminate film package by a fusion bonding, and the laminate film package, in which the unit cell has been already sealed, is received in a battery case such that pressure is exerted on the unit cell. The prior art laminate film packaged battery disclosed in the Japanese Patent Application laid-open is hereinbelow referred to as "fourth prior art".

Yet another prior art laminated film packaged battery is disclosed in Japanese Patent Application laid-open No. hei-6-111799. A group of electrodes is sandwiched between sheets of laminate film, and the sheets of laminate film are fusion bonded along the periphery. A space takes place between the bonded periphery and the group of electrodes, and silicone oil is spread in the space for good sealing. The prior art laminate film packaged battery disclosed in the Japanese Patent Application laid-open is hereinbelow referred to as "fifth prior art".

The prior art laminate film packages are broken down into two groups. Although spaces are defined in all the prior art laminate film packages for the electrolyte cells, the space is split into two sub-spaces formed in the sheets of laminate film 6a/6a' of the prior art laminate film package categorized in the first group, and the space is defined in one of the sheets of laminate film 6b of the prior art laminate film package categorized in the second group. Both of the sheets of laminate film 6a/6a' are deformed such that the deformed portions 2a/2a' define the sub-spaces as shown in FIG. 1A. A positive lead terminal 51 and a negative lead terminal 52 project from the laminate film package 6a/6a'. In case where the electrolyte cell is simply sandwiched between the sheets of laminate film, the laminate film package is also categorized in the first group. A laminate film package is formed like a bag. The electrolyte cell is put in the bag through an opening, and the opening is closed by fusing the peripheral portion defining the opening. This sort of laminate film package is also categorized in the first group. The particular feature of the laminate film packaged batteries of the type having the laminate film packages of the first group are reversible. The laminate film packages of the first group are hereinbelow referred to as "reversible laminate film package".

On the other hand, the laminate film packaged batteries of the type having the laminate film packages of the second group are non-reversible as shown in FIG. 1B. Only one of the sheets of laminate film 6b is deformed such that the deformed portion defines the space, and the other sheet 6c is flat. The positive lead terminal 51 and the negative lead terminal 52 also project form the laminate film package 6b/6c. The laminate film packages of the second group are referred to as "non-reversible laminate film package". The first to fifth prior art laminate film packages are broken down into the reversible laminate film package and the non-reversible laminate film package.

As described hereinbefore, the laminated film packages are expected to be durable and highly reliable. Since the electrolyte cells are sealed in the laminate film packages, the positive lead terminal 51 and negative lead terminal 52 are to pass through the sealed portion of the laminate film packages. The part of sealed portion through which the lead terminals 51/52 pass is hereinbelow referred to as "transit portion". The transit portion is a weak spot of the laminate film packages. The transit portion tends to be deteriorated. When the transit portion is deteriorated, the electrolyte is leaked through the transit portion, and the ambience is contaminated with the leaked electrolyte. When the electrolyte is spread onto a circuit board, malfunction is liable to take place in the electric circuit. Thus, the prior art laminate film packages have the structural weak spot, and the transit portions of the prior art laminate film packages are less durable and not reliable.

The present inventors contemplated the trouble at the transit portions of the prior art laminate film packages, and found that certain ingredients of the electrolyte were causative of the deterioration of the transit portions. The present inventors further analyzed the troubles in the prior art laminate film packaged batteries of the type having the reversible laminate film packages, and found that the transit portions had been deteriorated on the condition that the deformed portions 2b had been upwardly directed much more than those used on the condition that the deformed portions 2b had been downwardly directed. The prior art laminate film packaged batteries had been equipped with mobile bodies such as cars, motorcycle and bicycles or installed in stationary systems such as uninterruptible power supply systems and distributed electric-power storage systems. In these devices/systems, the gravitational force had been always exerted on the prior art laminate film packaged batteries in the vertical direction. The present inventors reasoned the trouble as follows.

The electrolyte existed in the vicinity of the lead terminals as well as between the electrodes in the prior art laminate film packaged batteries. This meant that the boundaries A between the lead terminals and the sheets of laminate film in the transit portions 61 had been always exposed to the electrolyte 8 (see FIGS. 2A and 2B). In case where the laminate film packaged batteries had operates in a high temperature ambience, the attack of the electrolyte had given rise to the deterioration of the transit portions 61. In case where the laminate film packaged batteries had been applied with extremely high voltage out of the normal range, the solvent of the electrolyte had been electrolyzed so that gas had been generated inside the laminate film packages. The gas had been generated under the conditions that the batteries had been charged with extremely high voltage out of the normal range and that the batteries had operated in extremely high temperature ambience. The gas had given rise to increase of the inner pressure. The gas pressure had been exerted to the electrolyte in the vicinity of the transit portions 61, and the sheets of laminate film had been liable to be separated from the lead terminals due to the pressurized electrolyte. Thus, the ingredients of the electrolyte and gas generated from the solvent were causative of the deterioration.

In case of the non-reversible laminate film packages, the deformed portion might have been upwardly directed in the usage. In this instance, the gas had been accumulated in the space, and the electrolyte had been gathered in the vicinity of the transit portions 61. The ingredients of the electrolyte had always attacked the boundaries, and the pressurized electrolyte had promoted the separation.

The present inventors think it proper to apply the above-described mechanism to the trouble in the prior art laminate film packaged batteries. It is desirable not to generate the gas inside the laminate film packages. However, a temporary control error in the battery control circuit and large amount of momentary current are unavoidable, and insufficient cooling capability may be not predictable. For this reason, it is necessary to develop laminate film packaged batteries on the condition that the gas will be unavoidably generated inside the laminate film packages. The internally generated gas causes the sheets of laminate film to be separated from the lead terminals, and permits the electrolyte to leak. If a large amount of gas is momentarily generated, the laminate film packages explode. Even if the ambience is not contaminated with the leaked electrolyte, the electrolyte cell is exposed to the air, and loses the electromotive force. The first to fifth prior art laminate film packaged batteries are investigated from the above-described viewpoint.

The first prior art laminate film packaged battery has the separable portion. When the internal pressure rises, the separable portion is firstly broken, and serves as a safety valve against the explosion. Nevertheless, the air, which enters the inner space through the opening, give "euthanasia" to the first prior art laminate film packaged battery. In case where the non-aqueous electrolyte is employed in the first prior art laminate film packaged battery, the moist air seriously damages the electrolyte cell, and causes the non-aqueous electrolyte cell to die within a short time. Therefore, the separable portion employed in the first prior art laminate film packaged battery can not improve the durability and reliability of the laminate film packaged battery.

The second prior art laminate film packaged battery does not have any safety valve. The second prior art laminate film packaged battery has been proposed for the purpose of enhancement in volumetric efficiency. The laminate film package is tightly held in contact with the electrolyte cell, and the laminate film package is as small in volume as the electrolyte cell. However, the laminate film package is less resistive against the internally generated gas. FIG. 3 shows the second prior art laminate film packaged battery. An electrolyte cell 9a is sealed in the laminate film package 9b, and terminal electrodes 51/52 project through the transit portions 61a. When gas is internally generated, the laminate film package bulges out as shown in FIG. 3B. The aluminum foils of the laminate film are less elastically deformed, and make the internal pressure rise. The high-pressure internal gas exerts force F to the laminate film package 9b, and causes it to be separated from the lead terminals 51/52. Thus, the second prior art laminate film package does not have any countermeasure against the internally generated gas, and is neither durable nor reliable.

The third prior art laminate film packaged battery has the electrolyte cell sealed in the laminate film package in vacuum. However, the laminate film package does not have any countermeasure against the internally generated gas. The gas is unavoidably generated inside the laminate film package, and makes the laminate film package separated from the electrolyte cell. Then, the laminate film package bulges out as similar to the laminate film package of the second prior art laminate film packaged battery. Thus, the third prior art laminate film package is neither durable nor reliable.

The laminate film package of the fourth prior art laminate film packaged battery is pressed to the electrolyte cell by virtue of the battery case. However, it is impossible perfectly to restrict the laminate film packaged battery with the battery case. The internally generated gas causes the laminate film package to bulge out against the restriction of the battery case, and the gas pressure is concentrated to weak spots. There is not any countermeasure against the gas pressure. The internally generated gas makes the laminate film package separated from the lead terminals. Thus, the fourth prior art laminate film packaged battery is neither durable nor reliable.

The fifth prior art laminate film packaged battery has the electrolyte cell sandwiched between the sheets of laminate film. The sheets of laminate film are not formed with any space before the sealing. However, the laminate film package does not have any countermeasure against the internally generated gas. When the gas is internally generated, the laminate film package is taken by surprise attack, and the laminate film package is separated from the lead terminals. Thus, the fifth prior art laminate film package is neither durable nor reliable.

The laminate film packaged battery may form a part of a power supply unit to be installed in the mobile bodies or stationary electric power supply systems. In the power supply unit, plural laminate film packaged batteries are connected to one another. The batteries of the power supply unit are hereinbelow referred to as "unit cells". The flat unit cells are employed in certain power supply units, and are stacked with one another. The laminate film packaged batteries are preferable for the flat unit cells. However, each of the laminate film packaged batteries except the uppermost one is sandwiched between the lower laminate film packaged battery and the upper laminate film package. The lower laminate film package and upper laminate film package restrict each laminate film packaged battery. In this situation, if the gas is internally generated, the laminate film package can not bulge out, and the internal gas pressure is rapidly increased. The high pressure gas exerts the force on the transit portions, and causes the laminate film package to be separated from the lead terminals. If the seal is broken at the transit portions, the unit cell rapidly loses the electromotive force, and the power supply unit can not exhibit the designed power generation capability.

When the flat unit cells of the type having the non-reversible laminate film package are stacked, the manufacturer pairs every two flat unit cells, and combines the two flat unit cells in the back-to-back, and stacks the flat unit cell pairs. The flat unit cells combined in the back-to-back are preferable, because the positive lead terminals are directly connected to the negative lead terminals. The power loss is minimized. FIGS. 4A and 4B show two sorts of stacked flat unit cells incorporated in the prior art power supply units.

The prior art power supply unit shown in FIG. 4A includes flat unit cells 50a, 50b and 50c. The flat unit cells 50a/50b/50c are of the type having the non-reversible laminate film package, and the positive lead terminals 51a/51b/51c and the negative lead terminals 52a/52b/52c project in the directions opposite to one another. The flat unit cells 50a and 50c have the respective deformed portions directed upwardly. The flat unit cell 50b is inverted, and the inverted flat unit cell 50b is inserted between the non-inverted flat unit cells 50a and 50c. If the inverted flat unit cell 50b turns at 180 degrees, all the flat unit cells 50a/50b/50c have the respective positive lead terminals 51a/51b/51c on the left side of the non-reversible laminate film packages, and all the negative lead terminals 52a/52b/52c project from the right side of the non-reversible laminate film packages.

The prior art power supply unit shown in FIG. 4B includes flat unit cells 50e, 50f and 50h. All the flat unit cells 50e/50f/50h are inverted, and are stacked. Although the flat unit cells 50e and 50h have respective positive lead terminals 51e/51h projecting from the right side of the non-reversible laminate film packages and respective negative lead terminals 52e/52h projecting from the left side of the non-reversible laminate film packages. However, the positive and negative lead terminals 51f/52f are oppositely arranged on the non-reversible laminate film package of the remaining flat unit cell 50f. The positive lead terminal 51f projects from the left side of the non-reversible laminate film package, and the negative lead terminal 52f projects from the right side.

Although the power supply unit shown in FIG. 4A is fabricated from only one sort of flat unit cells 50a/50b/50c, two sorts of flat unit cells 50e/50h and 50f are required for the power supply unit shown in FIG. 4B. All the flat unit cells 50a/50b/50c are fabricated through a single manufacturing line, and are economical. However, the non-inverted flat unit cells 50a/50c are incorporated in the stack, and are less resistive against the internally generated gas. On the other hand, the inverted flat unit cells 50e/50f/50h are stacked in the power supply unit shown in FIG. 4B, and are fairly resistive against the internally generated gas, because the electrolyte is gathered in the bottoms of the deformed portions. However, two manufacturing lines are required for the two sorts of flat unit cells 50e/50f/50h. Otherwise, the two sorts of flat unit cells 50e/50h and 50f are alternately fabricated through a batch process. The batch process is causative of a low productivity, and is expensive. Moreover, the two sorts of flat unit cells 50e/50h and 50f are to be alternately stacked. If the flat unit cells 50e/50f/50h are stacked in improper order, the power supply unit can not exhibit the target capability.

SUMMARY OF THE INVENTION

It is therefore an important object of the present invention to provide a battery, which has a laminate film package well durable and highly reliable.

It is also an important object of the present invention to provide a process for fabricating the battery.

In accordance with one aspect of the present invention, there is provided a battery keeping an attitude thereof stationary with respect to an up-and-down direction, and the battery comprises a package including a first component part formed with a cup downwardly directed and a second component part placed on and bonded to the first component part for closing the cup, an electrolyte cell received in the cup and hermetically sealed in the package and lead terminals having respective inner portions electrically connected to the electrolyte cell, respective outer portions projecting from the package and respective intermediate portions passing through the boundary between the first component part and the second component part and on a level with or higher than the upper surface of the electrolyte cell.

In accordance with another aspect of the present invention, there is provided a battery keeping an attitude thereof stationary with respect to an up-and-down direction, and the battery comprises a package including a first component part formed with a cup downwardly directed and a second component part placed on and bonded to the first component part for closing the cup, an electrolyte cell received in sad cup and hermetically sealed in the package and lead terminals having respective inner portions electrically connected to the electrolyte cell and respective outer portions projecting from the package in respective directions opposite to each other.

In accordance with yet another aspect of the present invention, there is provided a film packaged battery comprising a film package made of an expandable material and having a cup portion defining a space and a deformable portion expandable in a certain direction, an electrolyte cell having electrodes laminated in another direction different from the certain direction, received in the space and sealed in the film package, and terminals having respective inner portions electrically connected to the electrolyte cell and respective outer portions projecting to the outside of the package.

In accordance with still another aspect of the present invention, there is provided a process for fabricating a battery comprising the steps of forming a recess in a film forming part of a package, the recess being wider in bottom area than an electrolyte cell having plural plates, receiving an electrolyte cell having lead terminals projecting from the plural plates in the recess, and sealing the electrolyte cell in the package in vacuum in such a manner that the least terminals project to the outside of the package.

In accordance with yet another aspect of the present invention, there is provided a non-aqueous electrolyte battery comprising an electrolyte cell, a package having a bonded portion and sealing the electrolyte cell therein, and a sealant provided in the bonded portion and containing aromatic polyester resin and gas barrier resin.

In accordance with still another aspect of the present invention, there is provided a non-aqueous electrolyte battery comprising an electrolyte cell and a package including a first metallic component part having at least one surface coated with a resin layer and formed with a recess for receiving the electrolyte cell, a second metallic component part having a metallic surface and a layer of sealant inserted between the first metallic component part and the second metallic component part for sealing the electrolyte cell in the package, and the second metallic component part has a peripheral portion folded back in such a manner as to be held in contact with a peripheral portion of the first metallic component part.

BRIEF DESCRIPTION OF THE DRAWINGS

The features and advantages of the battery and the process will be more clearly understood from the following description taken in conjunction with the accompanying drawings, in which.

DESCRIPTION OF THE PREFERRED EMBODIMENTS

Figure 1A:
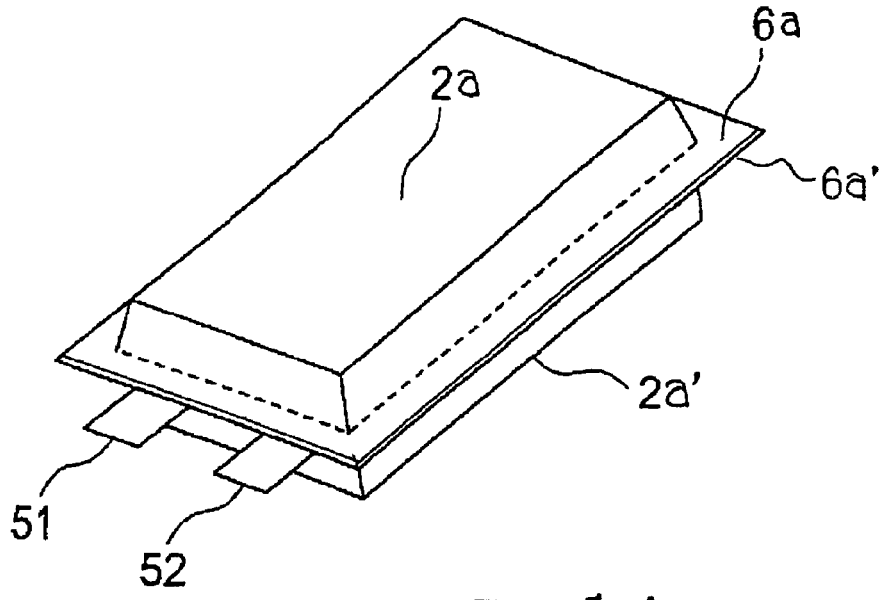
Fig. 1 A PRIOR ART
FIGS. 1A and 1B are schematic perspective views showing the prior art laminate film packaged battery of the type having the reversible laminate film package and the prior art laminate film packaged battery of the type having the non-reversible laminate film package.
Figure 1B:
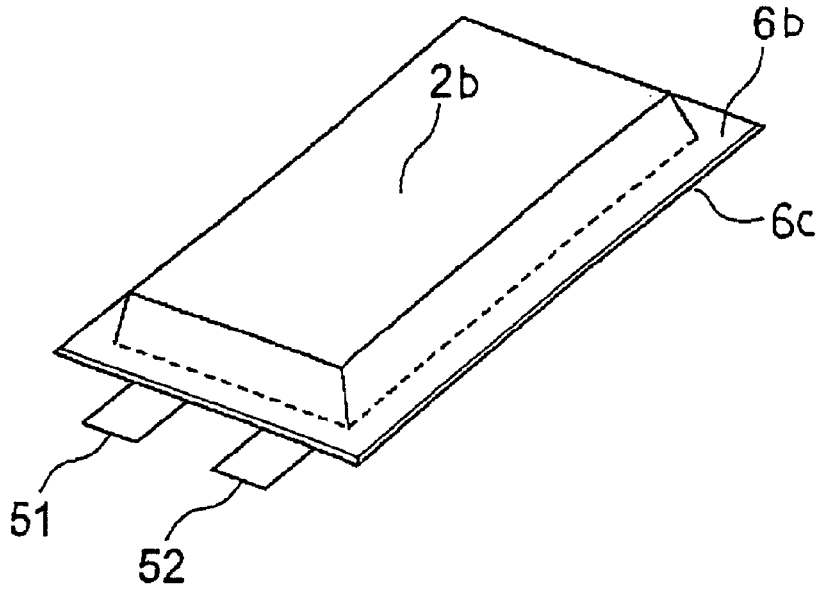
Fig. 1 B PRIOR ART
Figure 2A:
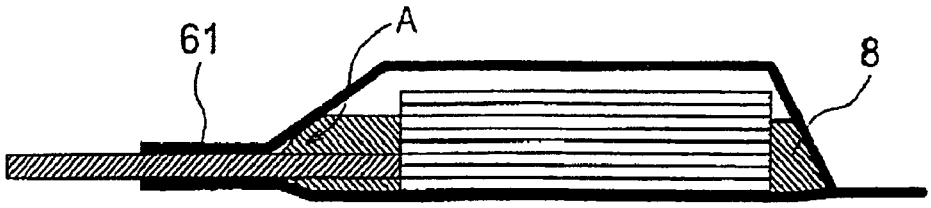
Fig. 2 A PRIOR ART
FIGS. 2A and 2B are schematic cross sectional views showing the structure of the prior art laminate film packaged batteries.
Figure 2B:
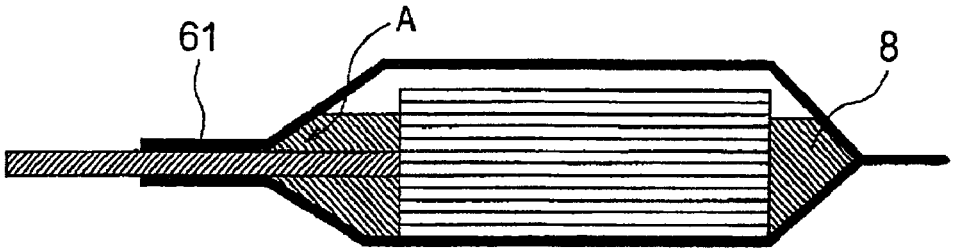
Fig. 2 B PRIOR ART
Figure 3A:
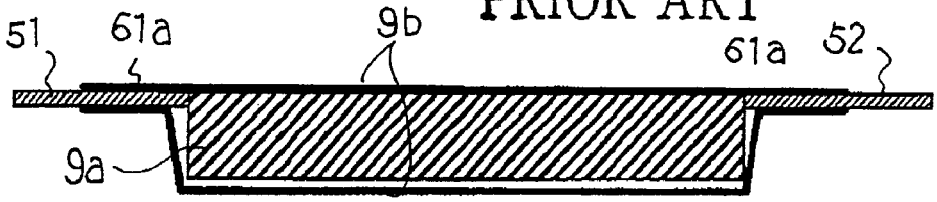
Fig. 3 A PRIOR ART
FIGS. 3A and 3B are schematic cross sectional views showing the second prior art laminate film packaged battery before and after the generation of internal gas.
Figure 3B:
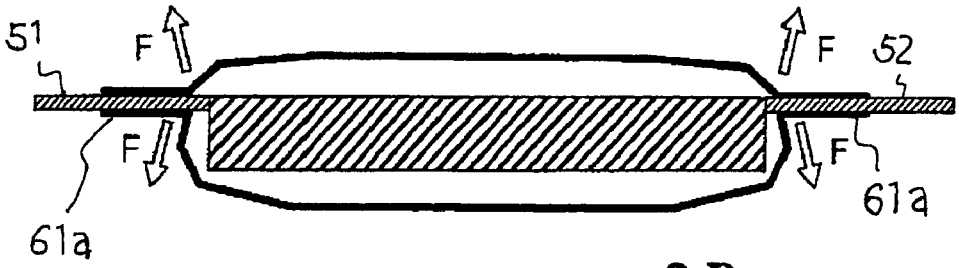
Fig. 3 B PRIOR ART
Figure 4A:
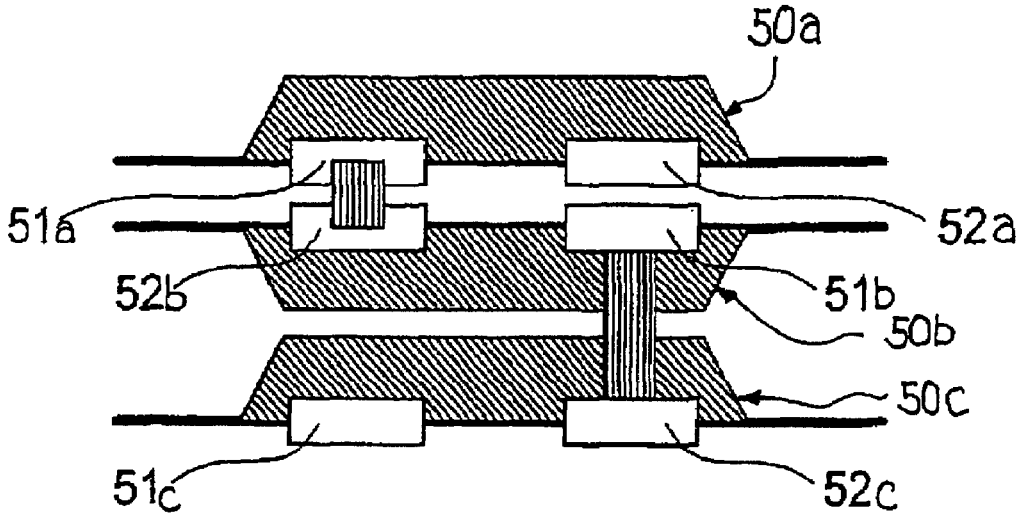
Fig. 4A PRIOR ART
FIGS. 4A and 4B are schematic cross sectional views showing the structure of the stacked flat unit cells incorporated in the prior art power supply units.
Figure 4B:
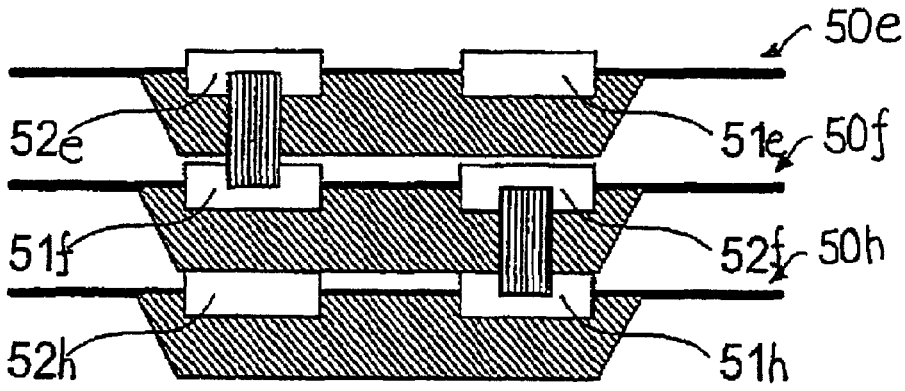
Fig. 4B PRIOR ART

A battery according to the present invention comprises an electrolyte cell, a package and lead terminals. The electrolyte cell includes plural electrodes and electrolyte. Two component parts are assembled into the package. One of the component parts is partially deformed so as to form a recess, and the electrolyte cell is received in the recess. The partially deformed component part serves as a lower part of the package, and the other component part forms an upper part of the package. The two component parts are bonded to one another along the periphery, and the electrolyte cell is sealed in the package. The lead terminals are connected at inner ends thereof to the electrolyte cell, and the outer end portions pass through transit portions of the bonded periphery of the package.

The battery is generally flat, and is installed in a device or system in such a manner that the electrodes are held horizontal. The lead terminals are equal in height from the bottom of the package to or higher than the uppermost electrode of the electrolyte cell. This feature is preferable from the viewpoint of the countermeasure against the attack of the electrolyte, because internally generated gas purges the electrolyte from the bonded periphery. In detail, even if the gas is internally generated from the electrolyte under the abnormal operating conditions, the gas is gathered under the inner surface of the upper component part of the package, and pushes out the electrolyte. Thus, the internally generated gas keeps the transit portions free from the attack of the electrolyte, and the component parts are less separated from the lead terminals. For this reason, the battery according to the present invention is durable and highly reliable. The battery described hereinbefore embodies the first concept of the present invention.

A unit cell or unit battery according to the present invention also comprises a package, an electrolyte cell, a positive lead terminal and a negative lead terminal. The electrolyte cell includes plural electrodes and electrolyte. Two component parts are assembled into the package. One of the component parts is partially deformed so as to form a recess, and the electrolyte cell is received in the recess. The partially deformed component part serves as a lower part of the package, and the other component part forms an upper part of the package. The two component parts are bonded to one another along the periphery, and the electrolyte cell is sealed in the package. The lead terminals are connected at inner ends thereof to the electrolyte cell, and the outer end portions pass through transit portions of the bonded periphery of the package.

One of the transit portions forms an end line forming a part of the bonded periphery, and the other transit portion forms another end line forming another part of the bonded periphery. The end lines are opposite to each other so that the positive lead terminal and the negative lead terminal project in directions opposite to each other. The unit cell is available for a power supply unit. Plural unit cells turn at 180 degrees, and are alternated with plural non-turn unit cells. The positive lead terminals of the non-turn unit cells are on the same side as the negative lead terminals of the unit cells already turned at 180 degrees, and the negative lead terminals of the non-turn unit cells are also on the same side as the positive lead terminals of the unit cells already turned at 180 degrees. The unit cells are easily electrically connected in series to one another.

The unit cells according to the present invention are advantageous over unit cells of the type having positive and negative lead terminals projecting in parallel from an end line of the package. When a manufacturer designs a power supply unit with a stack of unit cells, the manufacturer is to prepare two sorts of the unit cells of the type having the lead terminals projecting from an end line. The unit cells of one sort are inverted, and the positive/negative lead terminals of the inverted unit cells are connected to the negative/positive lead terminals of the non-inverted unit cells. On the contrary, only one sort of unit cells is required for the power supply unit, and the production cost of the power supply unit is drastically reduced. Moreover, the electrolyte is gathered at the bottom of the recesses after the assemblage into the stack. The transit portions are free from the attack of the electrolyte. Thus, the power supply unit is durable and highly reliable. Furthermore, the positive/negative lead terminals of the non-turn unit cells are connected to the negative/positive lead terminals of the unit cells already turned at 180 degrees through short interconnections. This results in reduction in resistance at the connections. The unit battery or unit cell embodies the second concept of the present invention.

Yet another battery according to the present invention is of a film packaged type, and comprises an electrolyte cell, a film package and lead terminals. The electrolyte cell includes plural electrodes and electrolyte. The electrolyte cell is sealed in the film package, and the lead terminals are connected at inner ends thereof to the electrolyte cell, and the outer end portions of the lead terminals project from the film package. The film package has been deformed in a certain direction different from the direction in which the electrodes are stacked. When the inner pressure is increased due to the internally generated gas, the gas exerts the increased inner pressure to the deformed portion of the film package, and causes the film package to be recovered to the initial contour. When the film package is recovered to the initial contour, the inner pressure is reduced. As a result, the transit portions, through which the lead terminals project outwardly, are less separated from the lead terminals. Thus, the film packaged battery according to the present invention is durable and highly reliable.

A modification of the film packaged battery is used in a power supply unit. Every two unit cells are assembled into a unit cell pair. The film package of the lower unit cell has a lower film component part formed with a recess and an upper film component part bonded to the lower film component along the periphery, and the electrolyte cell is sealed in the recess. In this instance, the upper film component part is partially deformed around the transit portions. When the gas pressure is increased, the gas presses the upper film component part, outwardly, and the upper film component part is recovered to the initial contour. Since the deformed portion is in the vicinity of the transit portions, the gas is gathered around the transit portions, and purges the transit portions from the electrolyte. The film packaged batteries embody the third concept of the present invention.

A non-aqueous electrolyte battery according to the present invention comprises a package, an electrolyte cell and lead terminals. The electrolyte cell includes plural electrodes and non-aqueous electrolyte. The electrolyte cell is sealed in the package by using a sealant. The lead terminals are connected at inner ends thereof to the electrolyte cell, and the outer end portions of the lead terminals pass through transit portions of the package. The sealant contains aromatic polyester resin and barrier resin against gas. The sealant is, by way of example, used for forming an inner surface of the package and heat sealing.

A part of the laminate film package is closed with the sealant. The heat seal-type package enhances the productivity of the non-aqueous electrolyte battery. The aromatic polyester resin withstands high temperature ambience, and is easily formed into a desired shape. Even though the non-aqueous electrolyte battery is exposed to high temperature ambience, the sealant keeps the package closed, and does not permit the outside air to enter the inner space defined in the package. Thus, the non-aqueous electrolyte battery according to the present invention is durable and highly reliable.

Component parts of the package may be secured to one another with only the above-described sealant. Otherwise, remaining portions of the component parts of the package may be secured to one another with another sort of sealant or other fastening means. If the package is closed with only the sealant, the sealant enhances the reliability of the package.

A non-aqueous electrolyte battery according to the present invention may have a package, and component parts of the package have respective peripheries, the surfaces of which are made of metal or alloy. In the following description, term "metal" means both of the metal and alloy. In other words, the peripheries are made from resin layers covered with metal layers. When the peripheries are bonded to one another by applying heat. A heater unit is pressed to the metal surfaces. If the heater unit is directly brought into contact with the resin layers, the melted resin tend to be adhered to the heater unit, and the manufacturer is to remove the residue of the resin from the heater unit, periodically. However, the component parts of the package according to the present invention have the metal layers. The metal layers prevents the heater unit from the melted resin. Thus, the metal layers keep the heater unit clean at all times, and make the throughput 6f the manufacturing line high.

Another non-aqueous electrolyte battery according to the present invention includes a package, into which component parts are assembled. A component part is formed from a resin coated metal plate, i.e., at least one surface of the metal plate is coated with resin. Another component part is formed from a metal plate without any resin coating. The resin coated metal component is formed with a recess, and an electrolyte cell is received in the recess. The periphery of the non-coated component part is fold back, and a pocket is formed along the periphery of the non-coated component part. The sealant is sandwiched between the periphery of the resin coated component part and the periphery of the non-coated component part in the pocket, and the resin coated component part is fusion bonded to the non-coated component part. Since the periphery of the resin coated component part is under the fold-back periphery of the non-coated component part, the heater is pressed to the fold-back periphery of the non-coated component part, and the resin is never adhered to the heater unit. Moreover, the recess is exactly formed in the resin coated component part, and the recess is adjusted to the target measurements. The fold-back periphery is so strong that the internally generated gas can not break the seal. Thus, the non-aqueous electrolyte battery according to the present invention is durable and highly reliable.

The resin coated component part has at least one outermost resin layer made of metal adhered resin. An example of the metal adhered resin is copolymerized polyester resin having ethylene terephthalate as a structural unit. The sealant contains aromatic polyester resin layer and the barrier layer against gas.

Another modification of the non-aqueous electrolyte battery has the lead terminals passing through the sealant. This feature is preferable, because the transit portions are weak. The internally generated gas is liable to break the seal at the transit portions. The sealant is strongly adhered to the lead terminals so that the seal is less broken. The sealant contains the barrier layer, and keeps the inner space in vacuum. Thus, the sealant enhances the durability and reliability of the non-aqueous of the non-aqueous electrolyte battery. The sealant at the transit portions may be different from the sealant between the other peripheries bonded to each other. The non-aqueous electrolyte batteries embody the fourth concept of the present invention.

First Embodiment

A battery embodying the present invention comprises lead terminals, a package and an electrolyte cell. The battery implementing the first embodiment is based on the first and second concept of the present invention. These components are hereinbelow described in detail.

Lead Terminals

The lead terminals are made of metal, which means both metal and alloy as described hereinbefore. Examples of the metal are Al, Cu, phosphor bronze, Ni, Ti, Fe, brass and stainless steel. The metal may be subjected to an annealing. The lead terminals are formed in plates, and the thickness is fallen within the range between 20 microns and 2 millimeters. The lead terminals may be bent like a crank.

Package

The package has an upper component part and a lower component part. It is preferable to shape a film-like raw material such as metal foils, thin resin plates or laminates of metal foil and thin resin plate into the upper component part and the lower component part. A recess, in which the electrolyte cell is received, is formed in the lower component part. There is not any limit on the contour of the upper component part in so far as the upper component part serves as a lid used for closing the recess. The upper component part has a contact area which is held in contact with an contact area of the lower component part, and the upper component part is secured to the lower component part. It is preferable that the upper component part is fusion bonded to the lower component part. From this viewpoint, heat fusible layers may form the contact areas. For example, base plates of 10 microns thick to 1 millimeter thick are coated with heat fusible resin of 3 microns to 200 microns thick.

The base plates are, by way of example, made of Al, Ti, Ti alloy, Fe, stainless steel, Mg alloy or polyester resin series such as polypropylene, polyethylene, polyphenylene sulfide, polytetrafluoroethylene and polyethylene terephthalate. Examples of the heat fusible resin are resin in polyester series such as polypropylene and modified resin thereof, polyethylene and modified resin thereof, polyphenylene sulfide and polyethylene terephthalate, polyamide and ethylene-vinyl acetate copolymer.

In case where the lower component part are as flexible as a film, it is preferable to form the recess through a drawings or deep drawings by using a punch and dies. The flexible film is put on the die, and is slidably pressed to the die. The punch is pressed to the flexible film, and pushes a part of the flexible film into the die. The recess may be formed in the lower component part through a stretch forming technique. A flexible film is fixed to the die. The flexible film on the die is not slidable. Another die is pressed to the flexible film. Then, the flexible film is partially stretched, and is plastically deformed. The lower component part may be formed through an injection molding. In case where the lower component part is thick, the recess may be formed through a pressing or casting.

The upper component part and lower component part may be separately formed from plates. In this instance, the upper component part and lower component part, which is formed with the recess, are assembled into the package. Otherwise, a film or plate is partially shaped into the upper component part and partially shaped into the lower component part. The film is fold back so that the recess is closed with the upper component part.

Electrolyte Cell

It is preferable that the electrolyte cell has a laminated structure of a positive electrode, a negative electrode and a separator. The positive electrode is to absorb cation or discharge anion.

The positive electrode contains active substance, and binder and other functional additives may be further contained. Any known material is available for the positive electrode. Examples are (1) metal oxides such as, for example, $LiMnO_2$, $LiMn_2O_4$, $LiCoO_2$ and $LiNiO_2$, (2) conductive high molecular compounds such as, for example, poly-acetylene and poly-aniline and (3) disulfido compounds expressed by general formula $(R—S_m)_n$ where R is aliphatic group or aromatic group, S is sulfur, m is an integer equal to or greater than 1 and n is an integer equal to or greater than 1. Examples of the disulfido compound are dithiogylcol, 2,5-dimercapto-1,3,4-thiadiazole and S-triazine-2,4,6-trithiol. An example of the binder is halogen-contained high molecular compound such as, for example, polyfluorovinylidene. A functional additive may enhance the electron conductivity, and examples of the functional additive are conductive high-molecular compound such as acetylene black, polypyrrole and polyaniline. Another functional additive may enhance the ion conductivity, and high molecular electrolyte is an example of the additive. More than one sort of additives may be contained in the positive electrode.

The negative electrode contains active material. Any known active material is available for the negative electrode in so far as the cation is accumulated and discharged. Examples of the active material are natural graphite, crystal carbon such as, for example, graphitized carbon, which is produced from coal or petroleum pitch through a high temperature heat process, and amorphous carbon which is produced from coal, petroleum pitch, acethylene pitch coke and lithium alloy such as metal lithium and AlLi.

The electrolyte, which is contained in the electrode group, is, by way of example, salt dissolved in basic solvent with high polarity. The solvent may be ethylene carbonate, propylene carbonate, dimethyl carbonate, diethyl carbonate, methylethyl carbonate, γ-butyrolactone, N,N'-dimethylformamido, dimethylsulfoxide, N-methylpyrrolidone and m-cresol. The salt may contain cation of alkaline metal such as Ki, K and Na and anion of halogen-contained compound such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. One sort of salt may be dissolved into one sort of solvent. Otherwise, more than sort of salt is dissolved into mixture of more than one sort of solvent. Polymer gel, which contains the electrolyte, is available for the electrolyte. A small amount of sufloran, dioxan, dioxoran, 1,3-propansultone, tetrahydrofuran and vinylenecarbonate may be added to the electrolyte.

Although the materials described hereinbefore are used in a lithium ion secondary battery, the present invention is applicable to other sorts of batteries such as, for example, a lead battery, a nickel-cadmium battery and a nickel-hydrogen battery.

It is possible to combine selected one or ones of the above-described component parts, i.e., the lead-terminals, package and electrolyte cell with other component parts of a film packaged battery and/or a non-aqueous electrolyte battery implementing other embodiments of the present invention.

Structure

Figure 5:
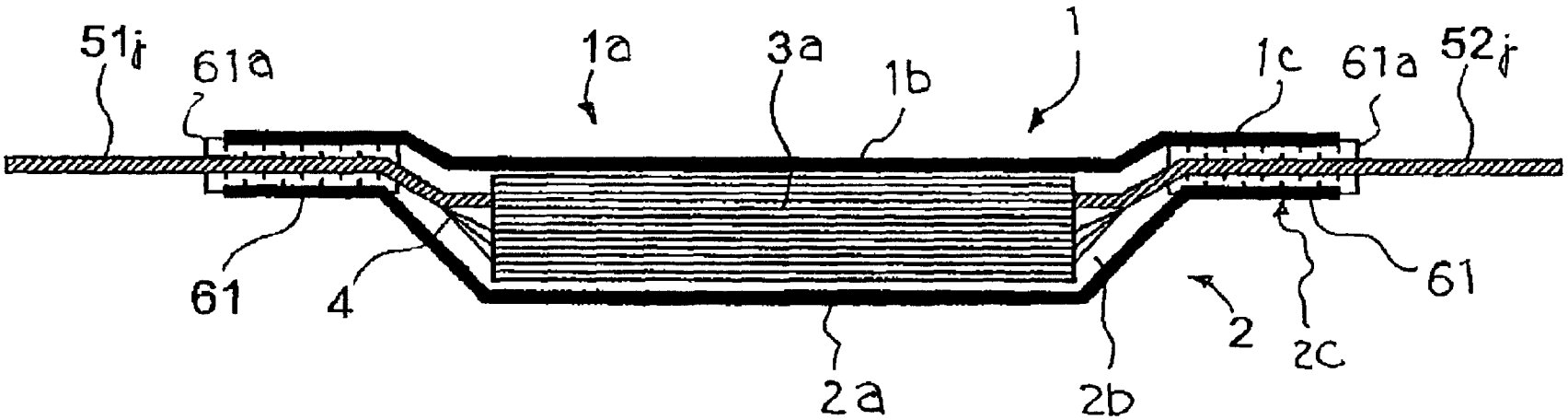
FIG. 5 is a cross sectional view showing the structure of a battery according to the present invention.

FIG. 5 shows the battery embodying the present invention. The battery is used as a stationary power source, and comprises a package 1, an electrolyte cell 3a, a positive lead terminal 51j and a negative lead terminal 52j. An upper component part 1a and a lower component part 2 are bonded to each other along the peripheries thereof, and form in combination the package 1. The electrolyte 3a is sealed in the package 1, and the positive lead electrode 51j and negative lead electrode 52j projects through transit portions 61 of the package 1 in directions opposite to each other.

The lower component part 2 is partially deformed like a cup 2a. A brim 2c radially projects from the periphery of the cup 2a. The upper component part 1a is also partially deformed like a saucer, and is broken down into a bottom 1b and a brim 1c. The brim 1c radially projects from the periphery of the bottom 1b. The upper component part 1a is placed on the lower component part 1b, and the brim 1c is overlapped with the brim 2c. In this instance, the brim 1c is fusion bonded to the brim 2c.

Since the cup 2a is deeper than the bottom 1b, the bottom 1b is spaced from the cup 2a, and the electrolyte cell 3a is accommodated in the space 2b between the cup 2a and the bottom 1b. The cup 2a and bottom 1b are shaped in such a manner that the space 2b is shaped a configuration like the contour of the electrolyte cell 3a. In case where the electrolyte cell 3a has a rectangular parallelepiped configuration, the cup 2a and bottom 1b define a rectangular parallelepiped space 2b. The cup 2a has four sides, and the bottom 1b also has four sides. In this instance, the brim 2c and brim 1c respectively project from the four sides of the cup 2a and the four sides of the bottom 1b. However, the brims 2c/1c may project from three sides of the cup and three sides of the bottom in another package.

The brims 2c/1c have two portions serving as the transit portions 61. The positive lead terminal 51j is welded to the electrolyte cell 3a at the inner welded portion 4, and the negative lead terminal 52j is welded to the electrolyte cell 3a at the inner welded portion. The lead terminals 51j/52j are bent so as to raise the outer and intermediate portions, and are further bent in order to make the outer portions in parallel to the electrolyte cell 3a. The outer portion of the positive lead terminal 51j projects through one of the transit portions 61 to the outside in a certain direction, and the outer portion of the negative lead terminal 52j projects through the other of the transit portions 61 to the outside in the direction opposite to the certain direction. For this reason, the outer portions of the lead terminals 51j/52j are not lower than the upper surface of the electrolyte cell 3a. In other words, the outer portions of the lead terminals 51j/52j are on a lever with or higher than the upper surface of the electrolyte cell 3a. When the brims 1c and 2c are fused with heat, the fused material is adhered to the outer portions of the lead terminals 51j/52j. The fused material is solidified. Then, the lead terminals 51j/52j are fixed to the solidified material layer 61a, and the electrolyte cell 3a is sealed in the package 1.

Assuming now that the battery is operating in the abnormal conditions, gas is generated from the electrolyte, and ascends toward the bottom 1b. As a result, the transit portions 61 are purged with the gas, and are not exposed to the electrolyte. This means that the transit portions 61 are free from the attack of the electrolyte. The solidified material layer is not deteriorated, and is held in contact with the lead terminals 51j/52j. Thus, the seal is not broken, and the battery embodying the present invention is durable and highly reliable.

When the battery is stationary installed in a device, apparatus or system, the cup 2a is directed to the downward direction. Namely, the battery takes the attitude shown in FIG. 5. In the description on the batteries based on the first and second concepts of the present invention, terms "install" and "installation" mean that the batteries are mounted on mobile bodies such as automobiles, motorcycles and bicycles or on stationary foundations in uninterruptible power supply systems and distributed electric-power storage systems. The installed batteries keep the attitude shown in FIG. 5, and are never inverted in normal operating conditions. For this reason, the batteries based on the first and second concepts are not supposed to be in portable telephones or wristwatches, because these devices are frequently inverted in the normal operating conditions.

Figure 6:
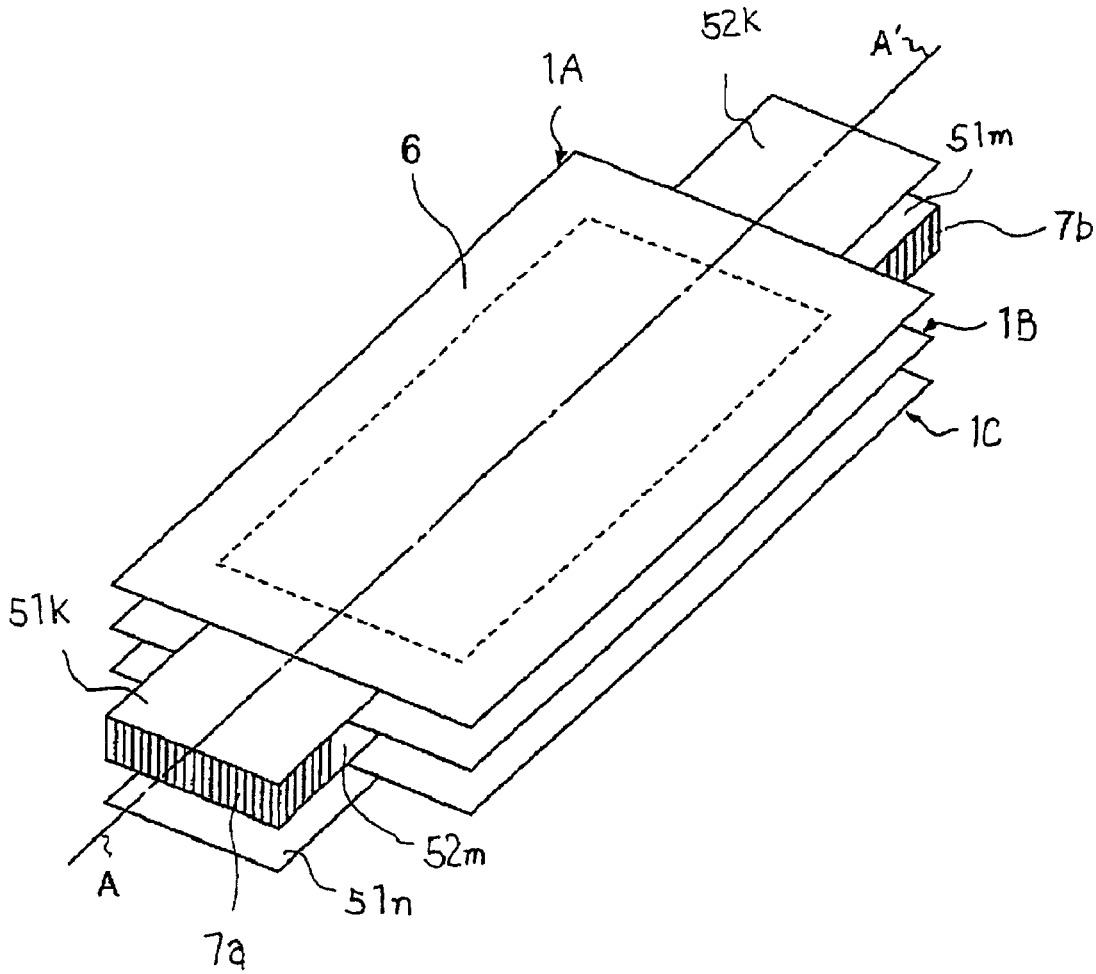
FIG. 6 is a schematic perspective view showing a stack of unit cells incorporated in a power supply unit according to the present invention.
Figure 7:
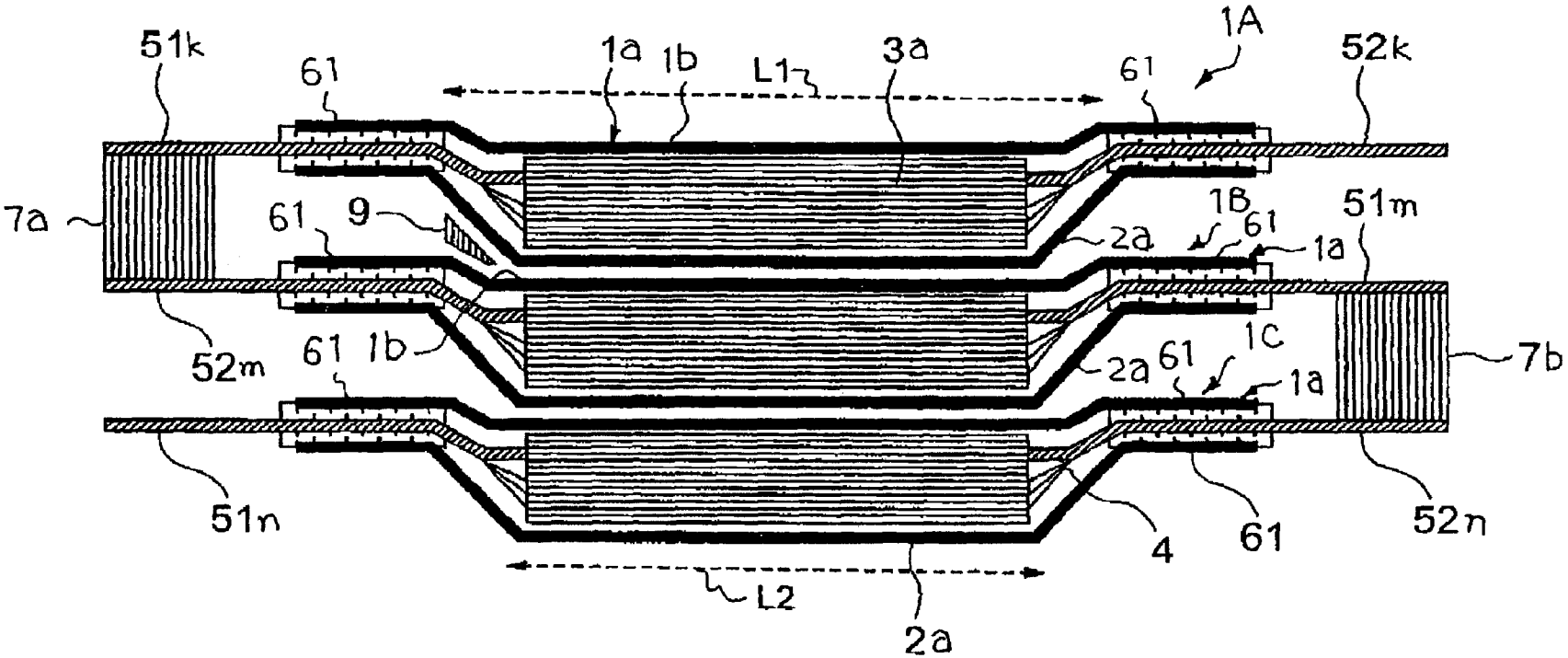
FIG. 7 is a cross sectional view taken along line A-A' of FIG. 6, and showing the structure of the stacked unit cells.

The batteries based on the first and second concepts are flat as shown in FIGS. 5, 6 and 7, and are horizontally maintained in the devices and systems. It is preferable that the electrodes of the electrolyte cells 3a are in parallel to the direction in which the batteries are flattened. The direction in which the batteries are flattened is hereinbelow referred to as "flat direction". The transit portions 61 extend in parallel to the flat direction, and are on a level with or higher than the uppermost electrodes of the electrolyte cells 3a. The electrolyte does not reach the transit portions 61. In other words, the transit portions 61 are free from the attack of the electrolyte. This results in that the batteries based on the first and second concepts are durable and highly reliable.

In case where at least the upper component part 1a is formed from a flexible film, internally generated gas pushes the bottom 1b, and makes the space 2b wider. The gas is gathered in the increased space 2b, and makes the transit portions 61 purged.

The batteries based on the first and second concepts are used in a power supply unit as shown in FIGS. 6 and 7. The power supply unit includes a stack of unit cells 1A/1B/1C, and the unit cells 1A/1B/1C are same as the battery shown in FIG. 5. The unit cell 1B has turned at 180 degrees so that the positive terminal 51m and negative terminal 52m are opposite to those of the unit cells 1A/1C. The unit cell 1B is inserted between the unit cells 1A and 1C, and the unit cells 1A/1B/1C are piled up. All the unit cells 1A/1B/1C have downwardly directed cups 2a, and the positive lead terminals 51k/51m are electrically connected to the negative lead terminals 52m/52n through interconnections 7a and 7b. Thus, the unit cells 1A/1B/1C forms the stack of unit cells 1A/1B/1C, and the unit cells 1A/1B/1C are electrically connected in series. The interconnections 7a/7b are short, and, accordingly, the resistance is rather small. The transit portions 61 are purged with internally generated gas so that the stack of unit cells 1A/1B/1C is durable and highly reliable.

Figure 8:
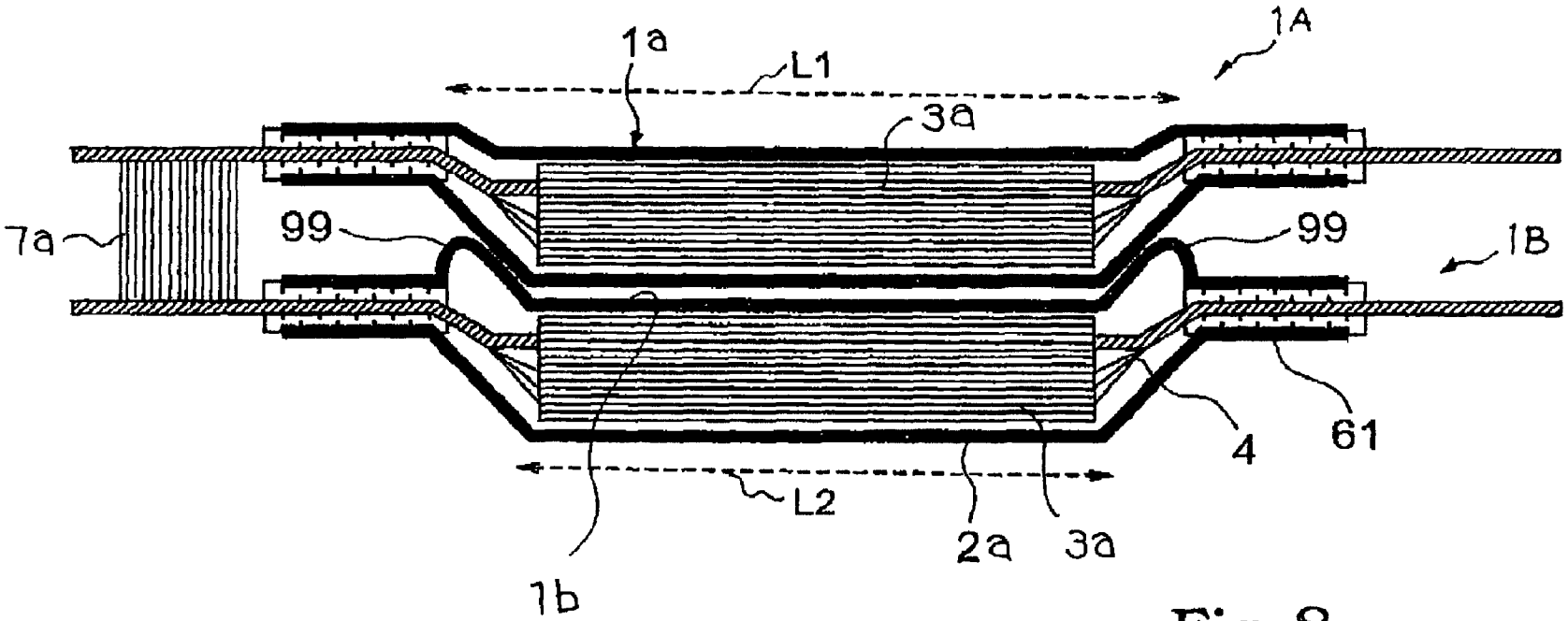
FIG. 8 is a cross sectional view showing the stack of unit cells partially bulged out due to internally generated gas.

In case where the upper component part 1a is made of flexible material such as synthetic resin, it is preferable that the peripheral portion of the cup 2a is spaced from the peripheral portion of the bottom 1b. In detail, the bottoms 1b and cups 2a have length L1 and L2, respectively, and the length L1 is greater than the length L2. The cups 2a are sharply bent, and the bottoms 1b are gently bent. When the unit cells 1A/1B/1C are piled up, clearances 9 take place between the cups 2a and the bottoms 1b, and permit the upper component parts 1a to bulge out due to the internally generated gas. A bulge 99 is shown in FIG. 8. The internally generated gas is gathered in the bulge 99, and the transit portions 61 are purged with the gas. The transit portions 61 are prevented from the electrolyte so that the seal is less liable to be broken.

It is preferable that the length L2 is equal to the length of the electrolyte cell 3a. The difference between the lengths L1 and L2 is fallen within the range between 6 millimeters and 40 millimeters. The difference is shared between both sides of the electrolyte cell 3a. The difference between the lengths L1 and L2 on each side is 3 millimeters to 20 millimeters.

Clearances may be formed by using spacers. Even if the length L1 is equal to the length L2, a spacer, which has a length less than the lengths L1 and L2, is inserted between the unit cells 1A and 1B, and causes the peripheral area of the upper component part 1a spaced from the peripheral area of the lower component part 2a. When gas is internally generated, the peripheral portion of the upper component part 1a bulges out so as to gather the internally generated gas. However, the stack of unit cells becomes longer than the stack shown in FIG. 7. From the viewpoint of the compactness, the package 1 shown in FIGS. 5, 7 and 8 are desirable.

As will be understood from the foregoing description, the package 1 keeps the lead terminals on a level with or lower than the upper surface of the electrolyte cell. Even when gas is internally generated, the gas is accumulated over the electrolyte cell 3a, and the transit portions are purged with the internally generated gas. The gas prevents the transit portions from the electrolyte so that the transit portions are less liable to be deteriorated. For this reason, the battery based on the first and second concepts is durable and highly reliable.

Second Embodiment

Figure 9:
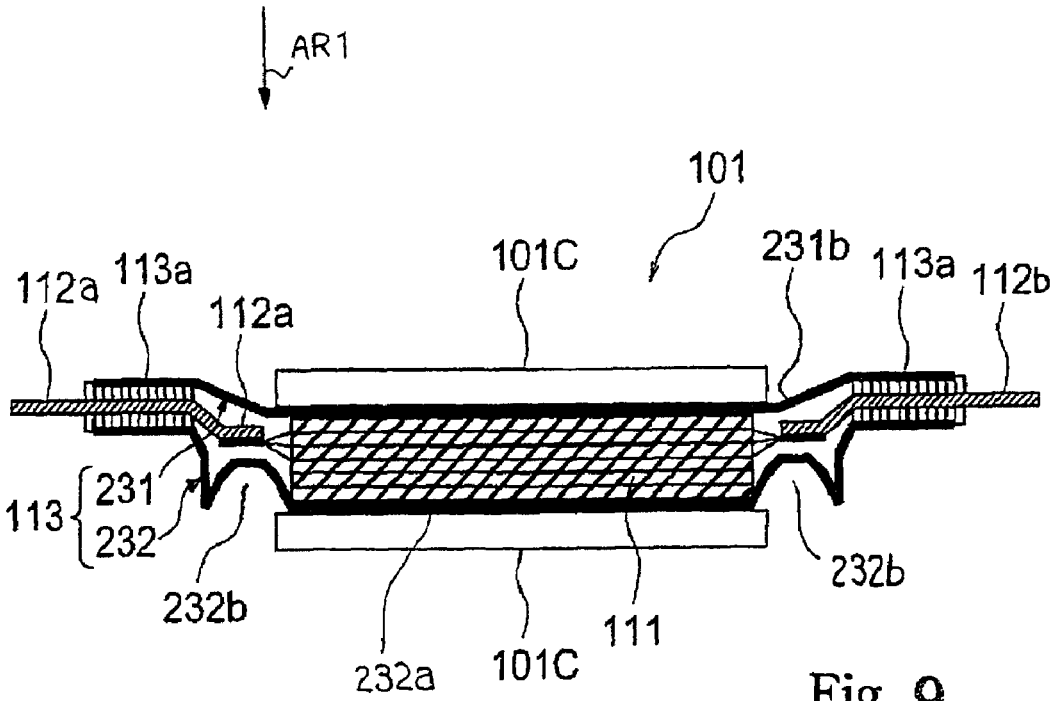
FIG. 9 is a schematic cross sectional view showing the structure of a film packaged battery according to the present invention.

Turning to FIG. 9 of the drawings, a film packaged battery 101 based on the third concept largely comprises an electrolyte cell 111, a film package 113, a positive lead terminal 112a and a negative lead terminal 112b. The film package 113 includes an upper component part 231 and a lower component part 232. The component parts, i.e., the lead terminals 112a/112b, film package 113 and electrolyte cell 111 are hereinbelow described in detail.

Lead Terminals

The lead terminals 112a/112b are made of metal, which means both metal and alloy as described hereinbefore. Examples of the metal are Al, Cu, phosphor bronze, Ni, Ti, Fe, brass and stainless steel. The metal may be subjected to an annealing. The thickness is fallen within the range between 20 microns and 2 millimeters. The lead terminals 112a/112b may be bent like a crank.

The lead terminals, positive and negative terminals 112a/112b may projects from a side of the package 113. Otherwise, a positive lead terminal 112a and a negative lead terminal 112b project through transmit portions 113a of a film package 101 in directions opposite to each other.

If the film packaged battery 101 is further based on the first concept of the present invention, the portions of the lead terminals 112a/112b which pass through the transit portions 113a are on a level with or higher than the upper surface of the electrolyte cell 111. The gravitational force is exerted on the film packaged battery in the direction indicated by arrow AR1. A cup 232a is formed in the central portion of the lower component part 232, and the cup 232 is directed downwardly, i.e., the direction AR1. The electrolyte cell 111 is maintained in the horizontal direction. The electrolyte is gathered in the bottom of the cup 232a, and internally generated gas is accumulated over the electrolyte. As a result, the transit portions 113a are purged with the internally generated gas, and the gas prevents the transit portions 113a from the electrolyte. The transit portions 113a are free from the attack of the electrolyte, and is not deteriorated. This results in good durability and high reliability. Even if the transit portion 113a is broken, only the gas is released from the transit portion 113a, and the electrolyte is held in the package 113.

Package

The film package 113 is made from a sheet of metal foil, a sheet of synthetic resin film or a composite film of the metal foil and synthetic resin film, and is flexible. Term "flexible" means that a member is elastically or resiliently deformed when small force is exerted on the member. The package 113 is 10 microns thick to 300 microns thick. It is more preferable that the thickness is fallen within the range between 50 microns and 200 microns. In case where the package 113 is less than 10 microns thick, the package 113 is liable to be broken. On the other hand, if the package 113 is greater in thickness than 300 microns, the flexibility is poor, and the film package 113 gives rise to increase of the internally generated gas.

The cup 232a is formed through a drawing or deep drawing, in which a punch is pressed against a film slidably maintained on a die. The stretch forming technique may be employed in the formation of the cup 232a. The injection molding technique is also available for the lower component part 232 with the cup 232a.

The film package 113 is partially deformed inwardly. The deformed portion, which is a particular feature based on the third concept, reverts to the previous shape. Then, the electrolyte is accumulated in the increased space, and the electrolyte is less liable to flow out from the film package 113. In order to accumulate the electrolyte in the increased space, it is necessary to direct the cup 232a downwardly as shown in FIG. 9 and to maintain the electrolyte cell 111 horizontally. When liquid electrolyte is used, the particular feature is desirable.

Electrolyte Cell

It is preferable that the electrolyte cell has a combined structure of a positive electrode, a negative electrode and a separator. The electrolyte cell is shaped in a plate. More than one set of laminated structure of the positive/negative electrodes and the separator may be piled up. An elongated laminated structure may be wound. The positive electrode, separator and negative electrode may be wound so as to form a coil.

The positive electrode is to absorb cation or discharge anion. The positive electrode contains active substance, and binder and other functional additives may be further contained. Any known material is available for the positive electrode. Examples are (1) metal oxides such as, for example, $LiMnO_2$, $LiMn_2O_4$, $LiCoO_2$ and $LiNiO_2$, (2) conductive high molecular compounds such as, for example, poly-acetylene and poly-aniline and (3) disulfido compounds expressed by general formula $(R—S_m)_n$ where R is aliphatic group or aromatic group, S is sulfur, m is an integer equal to or greater than 1 and n is an integer equal to or greater than 1. Examples of the disulfido compound are dithiogylcol, 2,5-dimercapto-1,3,4-thiadiazole and S-triazine-2,4,6-trithiol. An example of the binder is halogen-contained high molecular compound such as, for example, polyfluorovinylidene. A functional additive may enhance the electron conductivity, and examples of the functional additive are conductive high-molecular compound such as acetylene black, polypyrrole and polyaniline. Another functional additive may enhance the ion conductivity, and high molecular electrolyte is an example of the additive. More than one sort of additives may be contained in the positive electrode.

The negative electrode contains active material. Any known active material is available for the negative electrode in so far as the cation is accumulated and discharged. Examples of the active material are natural graphite, crystal carbon such as, for example, graphitized carbon, which is produced from coal or petroleum pitch through a high temperature heat process, and amorphous carbon which is produced from coal, petroleum pitch, acethylene pitch coke and lithium alloy such as metal lithium and AlLi.

The electrolyte, which is contained in the electrode group, is, by way of example, salt dissolved in basic solvent with high polarity. The solvent may be ethylene carbonate, propylene carbonate, dimethyl carbonate, diethyl carbonate, methylethyl carbonate, γ-butyrolactone, N,N'-dimethylformamido, dimethylsulfoxide, N-methylpyrrolidone and m-cresol. The salt may contain cation of alkaline metal such as Ki, K and Na and anion of halogen-contained compound such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. One sort of salt may be dissolved into one sort of solvent. Otherwise, more than sort of salt is dissolved into mixture of more than one sort of solvent. Polymer gel, which contains the electrolyte, is available for the electrolyte. A small amount of sufloran, dioxan, dioxoran, 1,3-propansultone, tetrahydrofuran and vinylenecarbonate may be added to the electrolyte.

The third concept of the present invention is applicable to thin film packaged flat devices such as, for example, electric double layer capacitors, electrolyte capacitors and various sorts of sensors as well as the film packaged battery. The above-described lead terminals, film package and electrolyte cell may be combined with other component parts of the batteries based on the first, second and fourth concepts of the present invention.

Structure

Figure 10:
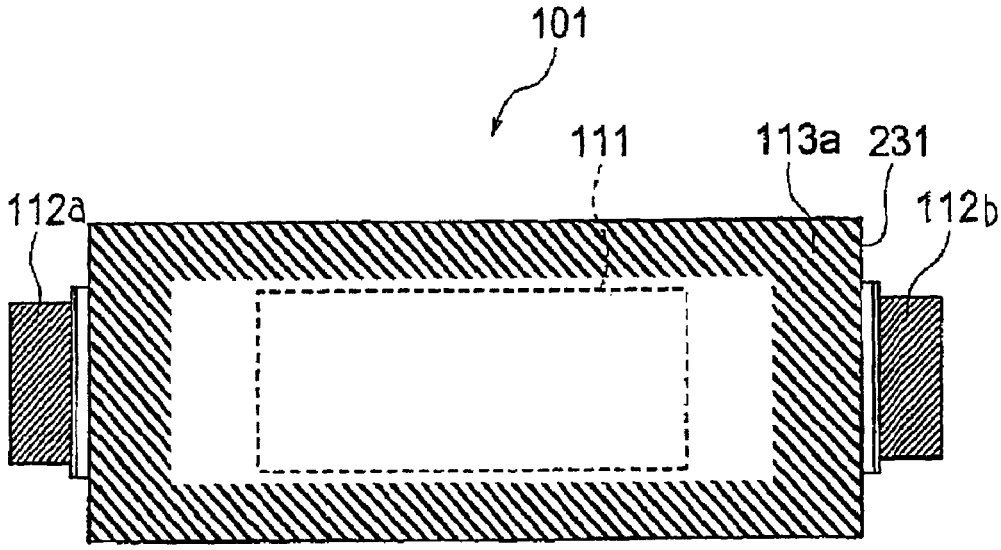
FIG. 10 is a plane view showing the film packaged battery.

Description is hereinbelow made on the structure of the film packaged battery based on the third concept of the present invention with concurrent reference to FIGS. 9 and 10. As simply described hereinbefore, the film packaged battery 101 includes the electrolyte cell 111 sealed in the film package 113 in vacuum and the positive/negative lead terminals 112a/112b projecting from the electrolyte cell 111 through the transit portions 113a to the outside of the package 113. The electrolyte 111 includes the positive electrode, negative electrode and separator, and the upper component part 231 and lower component part 232 are fusion bonded so as to form the film package 113.112a/112b are sandwiched between the upper component part 231 and the lower component part 232, and the upper component part 231 and lower component part 232 are adhered to the lead terminals 112a/112b. The positive terminal 112a is electrically isolated from the negative terminal 112b by means of the part of the film package 113. The film package 113 is expandable in a direction different from the direction AR1 in which the electrodes are laminated.

The positive electrode, negative electrode and separator may be implemented by plural positive electrode plates, plural negative electrode plates and plural separator layers. These plates and layers are combined in various manners. For example, the separator layers are respectively sandwiched between the positive electrode plates and the negative electrode plates, and the resultant laminations are piled up. In another implementation, the positive electrode plates, separator layers and negative electrode plates are sequentially piled up in such a manner that the positive electrode plates or the negative electrode plates form the uppermost and lowermost surfaces of the electrolyte cell 111.

Reference numeral 101C designates presser plates. The presser plates 101C make the electrode plates and spacer layers tightly held in face-to-face contact with one another. However, it is preferable that the presser plates 101C are brought into contact with the parts of the upper/lower component parts 231/232 as wide as the upper and lower surfaces of the electrolyte cell 111, because non-contact portion are allowed to be warped for forming the dents 231b/232b. The presser plates 101C may be secured to a rigid package case in such a manner that the presser plates 101C exert force on the upper/lower component parts 231/232. Otherwise, the presser plates 101C may be integral with the rigid package case. Springs, an air-bag or a pneumatic cylinder may be used for pressing the upper/lower component parts with the presser plates 101C.

In case where the presser plates 101C are not used for the film packaged battery 101, the electrode plates and spacer layers may be adhered to or integral with one another in order to keep the electrode plates and spacer layers tightly held in contact with one another.

One of the methods for keeping the electrode plates and spacer layers tightly held in contact with one another is to insert adhesive layers between the electrode plates and the spacer layers. Another method is to use solid, semi-solid or gel electrolyte filling porous electrode plates and porous spacer layers. Adhesive polymer, which fills the through-holes of the positive/negative electrodes and porous separator layer, is disclosed in Japanese Patent Application laid-open No. 2000-306569. Liquid polymer is disclosed in Japanese Patent Application laid-open No. hei-10-172606. In the Japanese Patent Application laid-open, the liquid polymer is spread over the surfaces of the separator layer, and the electrodes are brought into contact with the liquid polymer spread surfaces of the separator. When the liquid polymer is dried, the separator is adhered to the electrodes. Electrolyte containing precursor of the gel is used in yet another method. The electrolyte penetrates into the lamination of electrodes, and, thereafter, the precursor is converted to gel so as to tightly hold the electrodes and separator.

Before the upper component part 231 is fusion bonded to the lower component part 232, the upper component part 231 is flat without any dent. On the other hand, the cup 232a has been already formed in the lower component part 232 before the fusion bonding. The electrolyte cell 111 is received in the cup 232a. The cup 232a is larger in volume than the electrolyte cell 111, and is wider than the uppermost/lowermost surfaces of the electrolyte cell 111. In other words, the cup 232a has a cross section, to which the arrow AR1 is normal, wider than the bottom surface of the electrolyte cell 111. The electrolyte cell 111 is sealed in vacuum, and the space where the electrolyte cell 111 is maintained is lower in pressure than the atmosphere. When the film packaged battery is taken out in the atmosphere, the upper component part is depressed, and is inwardly warped. This results in that a dent 231b takes place in the central portion of the upper component part 231. Similarly, the lower component part 232 is inwardly warped around the electrolyte cell 111, and a dent 232b is formed in the lower component part 232 around the electrolyte cell 111.

Assuming now that the film packaged battery 101 is operating in the abnormal conditions, gas is internally generated, and gives rise to increase of the internal pressure. The part of the lower component part 232 is stretched, and the lower component part 232 is recovered to the initial shape before the sealing. This results in that the dent 232b is left, and the inner space is increased. The electrolyte and gas are accumulated in the additional space around the electrolyte cell 111, and is spaced from the transit portions 113a. The parts of the upper component part 231 on both sides of the upper presser plate 101C bulges out, and is spaced from the upper surface of the electrolyte cell 111. The space is further increased, and the internal pressure is reduced. Thus, the inwardly warped portions, which define the dents 231b/232b, prevent the film package 113 from breakage of sealing. For this reason, the film package battery 101 is durable and highly reliable.

It was said that the space was to be equal in volume to the electrolyte. Although a film packaged battery, the cup of which is equal in volume to the electrolyte cell, achieves good space efficiency, the film package bulges out due to the internally generated gas, and the seal is much liable to be broken.

The film packaged battery based 101 on the third concept of the present invention is smaller in space efficiency than the film packaged battery with the cup tightly receiving the electrolyte cell. However, the film package 113 gives good durability and high reliability to the film packaged battery 101 by virtue of the inwardly warped portions.

Fabrication Process

Figure 11A:
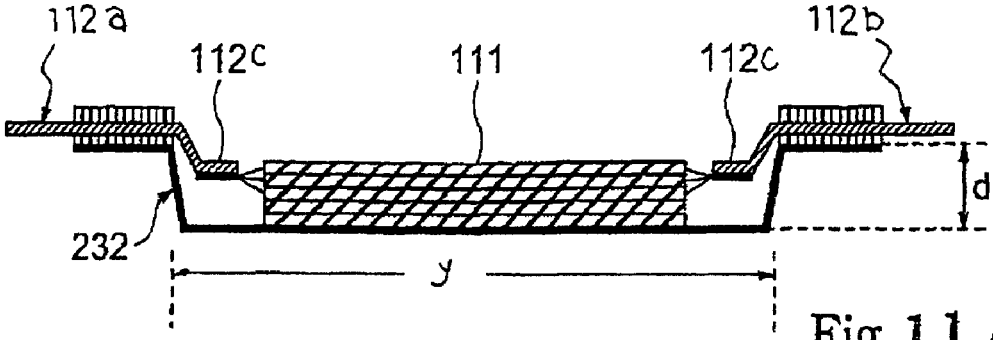
FIG. 11A is a schematic cross sectional view showing an electrolyte cell received in a lower component part in a step of a fabrication process for the film packaged battery.
Figure 11B:
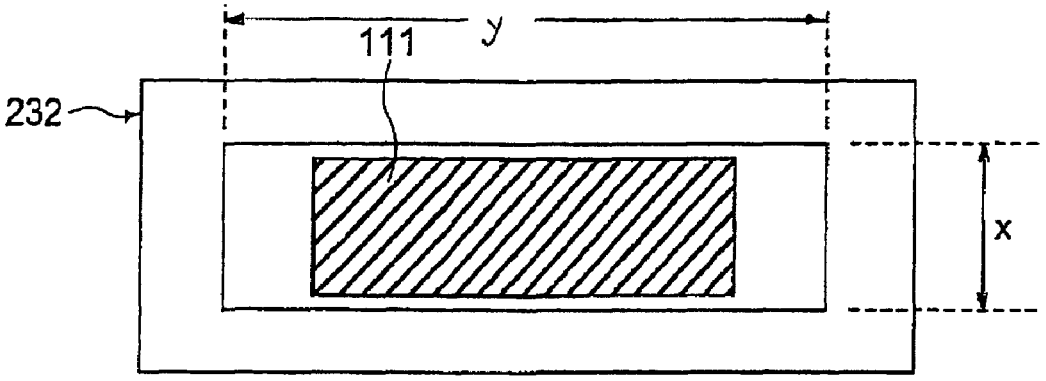
FIG. 11B is a plane view showing the electrolyte cell received in the lower component part.
Figure 11C:
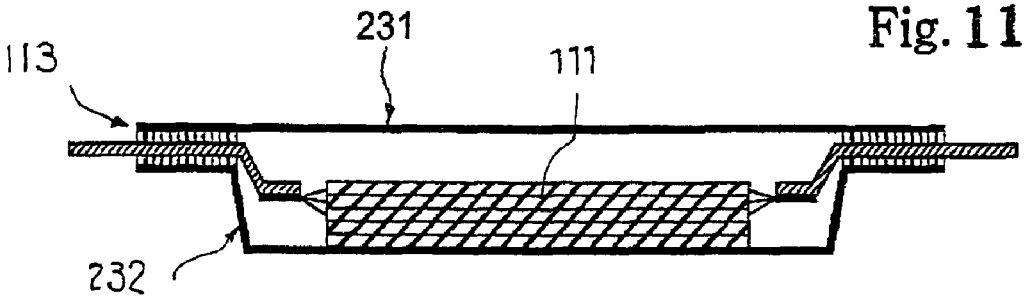
FIG. 11C is a cross sectional view showing the electrolyte cell sealed in the package in another step of the fabrication process.

FIGS. 11A to 11C show a process for fabricating the film packaged battery. The lead terminals 112a/112b are removed from the structure shown in FIG. 11B. The process starts with preparation of the upper component part 231, lower component part 232, electrolyte cell 111 and terminal leads 112a/112b. The cup has been already formed in the lower component part 232.

The positive and negative lead terminals 112a/112b are welded at the inner portions 112c to the collector foils of the electrolyte cell 111, and the electrolyte cell 111 is put in the cup as shown in FIGS. 11A and 11B. The length, width and depth of the cup are assumed to be y, x and d. The volume of the recess defined in the cup is expressed as "x×y×d". The electrolyte cell 111 has the width roughly equal to x. However, the length and depth of the electrolyte cell 111 is less than y and d. For this reason, the electrolyte cell 111 is smaller in volume than the recess, and is loosely received in the cup as shown in FIGS. 11A and 11B. It is preferable that the volumetric ratio of the recess to the electrolyte cell 111 is fallen within the range between 1.15 and 2. If the volumetric ratio is less than 1.15, the dents 231b/232b are too small to form the additional space for accumulating the electrolyte and gas. On the other hand, if the volumetric ratio is greater than 2, the film packaged battery 101 is too large, and is undesirable from the viewpoint of the volumetric energy density. Nevertheless, in case where the area "x×y" is much wider than the bottom surface of the electrolyte cell 111, it is allowed that the depth is less than the height of the electrolyte cell 111. In this instance, the volumetric ratio may be less than 1.

Subsequently, the flat upper component part 231 is put on the lower component part 232. The recess is closed with the flat upper component part 231. The electrolyte cell 111 is spaced from the inner surface of the flat upper component part 231 as well as the side walls of the cup.

The resultant structure is placed in vacuum chamber, and heat is applied to the brims of the upper/lower component parts 231/232 in vacuum. Then, the brims are partially fused, and are fusion bonded to each other. The electrolyte 111 is sealed in the film package 113 as shown in FIG. 11C.

The resultant film packaged battery is taken out from the vacuum chamber, The atmospheric pressure is exerted on the upper component part 231 and the lower component part 232, and the upper component part 231 and lower component part 232 are inwardly warped due to the differential pressure so that the dents 231b/232b take place as shown in FIG. 9.

A modification of the film packaged battery 101 may have a cup, the length or width of which is equal to or slightly less than the length or width of the electrolyte 111. In these instances, the dent 232b is produced on both sides of the electrolyte cell 111, and is effective against the internally generated gas under the condition that the electrolyte cell 111 is sandwiched between the presser plates 101C.

Figure 12A:
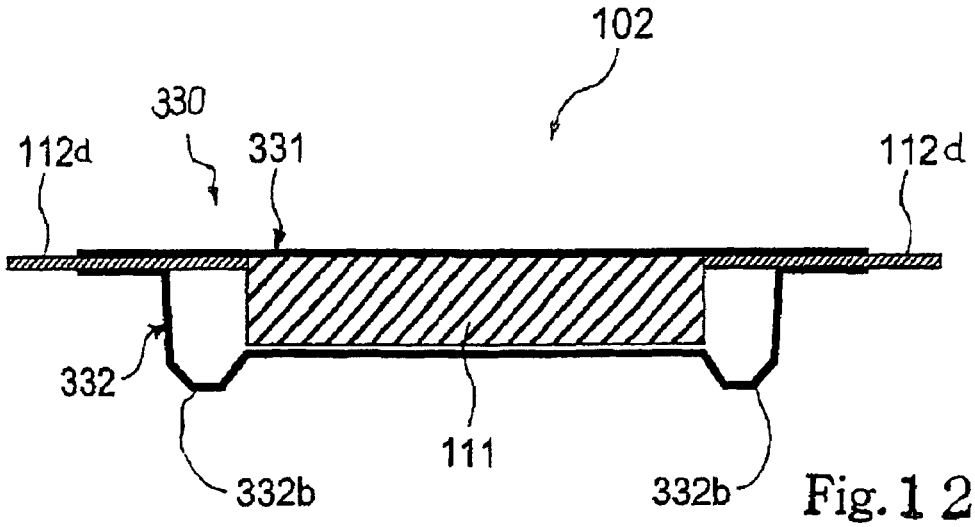
FIGS. 12A and 12B are schematic cross sectional views showing another process for fabricating a film packaged battery according to the present invention.
Figure 12B:
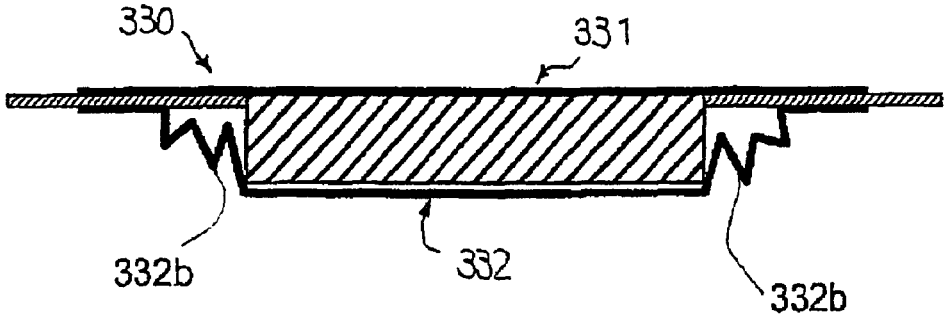

FIGS. 12A and 12B show another process for fabricating a film packaged battery 102 according to the present invention. The process starts with preparation of an upper component part 331, a lower component part 332, an electrolyte cell 111 and lead terminals 112d. The lower component part 332 has a cup, and the cup bulges out along the peripheral portion 332b. The lead terminals 112d are connected to the electrolyte cell 111, and project to the outside of a film package 330 in directions opposite to each other.

The electrolyte cell 111 is put into the recess defined in the cup, and the flat upper component part 331 is laminated on the lower component part 332. The recess is closed with the central portion of the upper component part 331 as shown in FIG. 12A.

The resultant structure is placed in a vacuum chamber, and the flat upper component part 331 is fusion boded to the lower component part 332 along the peripheries thereof. The electrolyte cell 111 is sealed in the film package 330. When the film package 330 is taken out from the vacuum chamber, the atmospheric pressure is exerted on the bulge portion 332b, and crushes the bulge portion 332b as shown in FIG. 12B.

When internally generated gas gives rise to increase of the inner pressure, the crushed portion 332b is recovered to the bulge portion 332b, and keeps the inner pressure constant. The increment in volume is larger than that of the lower component part 232 so that the amount of gas accumulated is larger than that of the gas accumulated in the additional space. In case where the film package 330 is made from a sheet of laminate film, i.e., lamination of a metal foil or foils and a synthetic resin layer or layers, it is preferable to use the lower component part 332 with the bulge portion 332b, because the metal foil or foils are hardly stretched.

The bulge portion 332b is more desirable than a dent formed in a lower component part before the sealing. Although the bulge portion 332b is to be pushed into the recess, the crushed portion 332b is smoothly recovered to the bulge portion 332b, because the crushed portion 332b has a tendency to return to the initial form. On the other hand, if the dent is formed through a drawings, the dent tends to keep the form. The force to bulge out the dent portion is larger than the force to bulge out the crushed portion 332b. For this reason, the crushed portion 332b bulges out without increasing the internal pressure.

Figure 13:
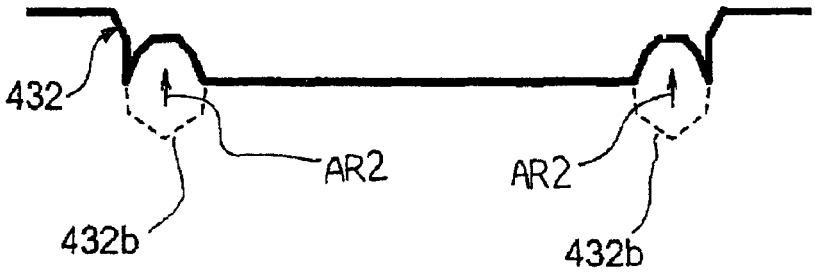
FIG. 13 is a schematic cross sectional view showing a modification of a lower component part of the film package.

The bulge portion may be pushed into the recess before the sealing in vacuum. In this instance, the lower component part 432 has a bulge portion, the outline of which is indicated by broken lines in FIG. 13, upon completion of the shaping step. Force is exerted on the bulge portion 432b in a direction indicated by arrows AR2 for forming crushed portion. The crushed portion exhibits a tendency to return to the initial shape. Thereafter, the electrolyte cell 111 is sealed in the package. The crushed portion 432b also bulges out when gas is internally generated, and the gas is accumulated in the additional space. The crushed portion 432b is also liable to smoothly bulge out so that the gas is accumulated without increase the gas pressure. The tendency is strongly given through the shaping step. If the bulge portion 432b rapidly projects from the flat bottom portion of the cup, the crushed portion 432b exhibits the strong tendency.

As will be understood from the foregoing description, the film packaged battery based on the third concept of the present invention has the film package, a part of which is inwardly deformed. When the internally generated gas gives rise to increase of the inner pressure, the deformed portion such as 231b/232b, 332b or 432b bulges out so as to increase the inner space. The gas is accumulated in the increased space so that the inner pressure is not rapidly increased. This means that the seal is hardly broken. Thus, the film packaged battery based on the third concept of the present invention is durable and highly reliable.

Although Japanese Patent Application laid-open No. 6-111799 teaches the electrolyte cell sealed in the airtight synthetic resin sheets in such a manner that the hollow space is produced in the vicinity of the electrolyte cell, the airtight synthetic resin sheets are flat, and do not have any inwardly deformed portion. When gas gives rise to increase of the inner pressure, the entire surfaces of the film package per se bulge out. The increment of inner space is not so large that the inner pressure is raised, and the seal is much liable to be broken.

Third Embodiment

Figure 14:
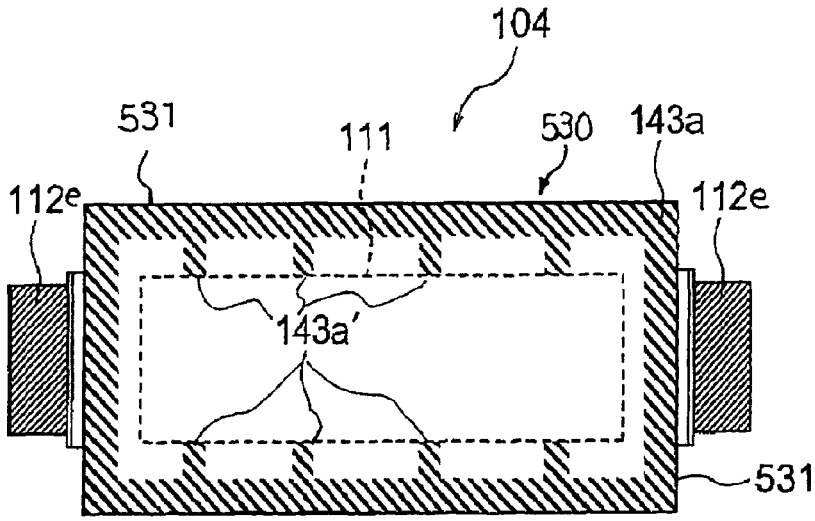
FIG. 14 is a plane view showing the structure of another film packaged battery according to the present invention.
Figure 15:
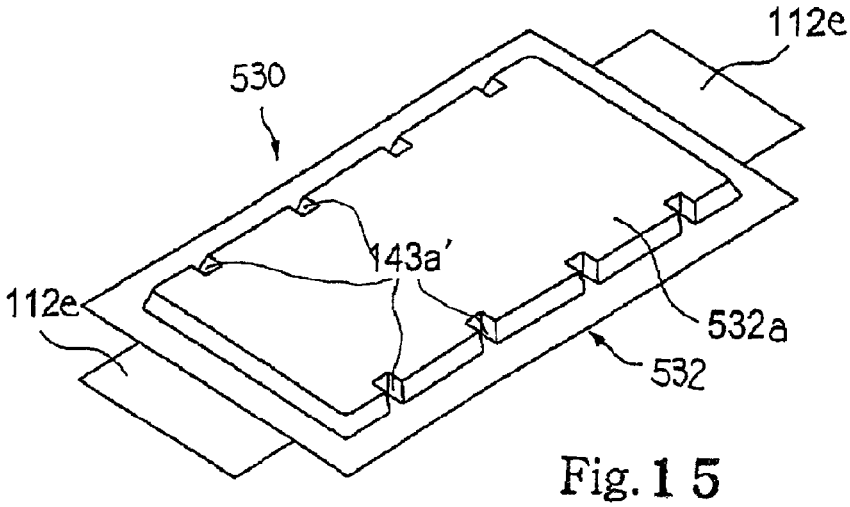
FIG. 15 is a perspective bottom view showing a lower component part before sealing in vacuum.
Figure 16:
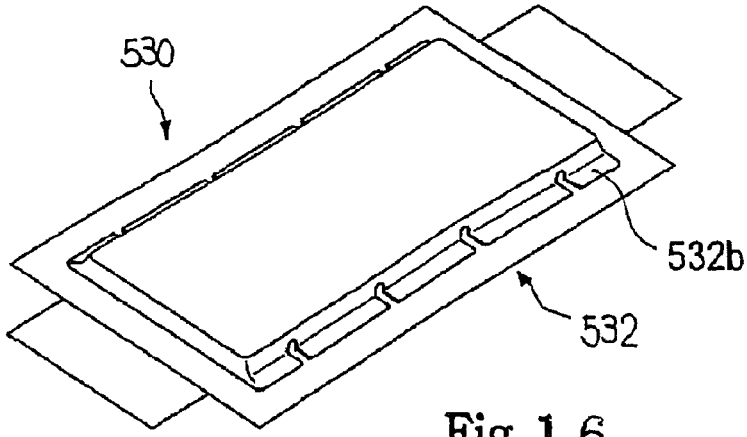
FIG. 16 is a perspective bottom view showing the lower component part after the sealing step.
Figure 17:
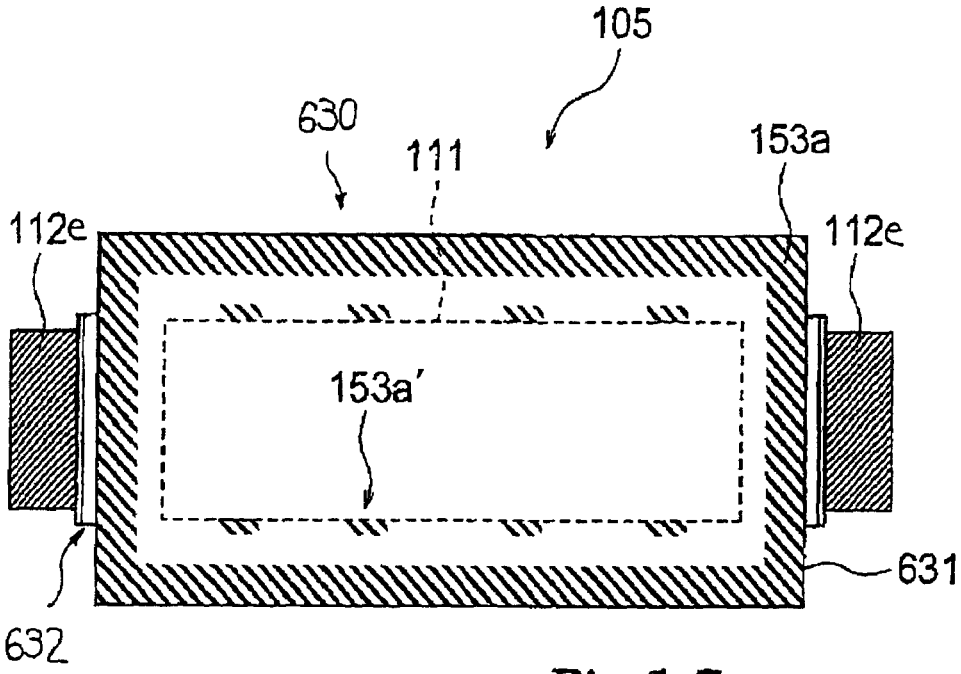
FIG. 17 is a plane view showing a modification of the film packaged battery.
Figure 18:
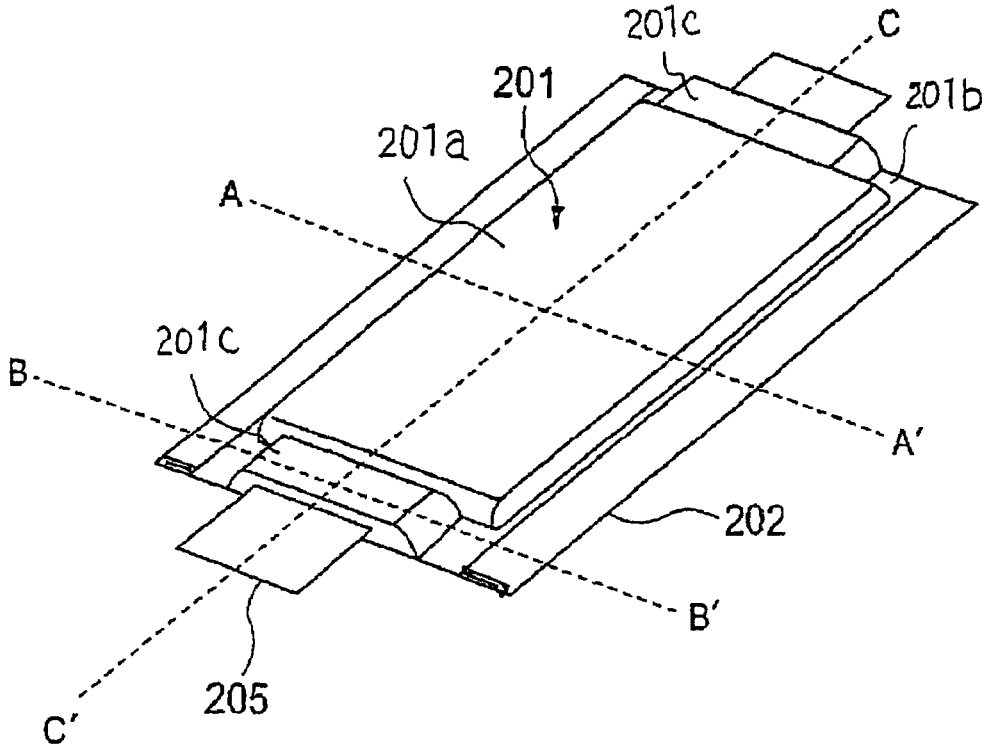
FIG. 18 is a perspective bottom view showing the structure of a non-aqueous electrolyte battery according to the present invention.
Figure 19:
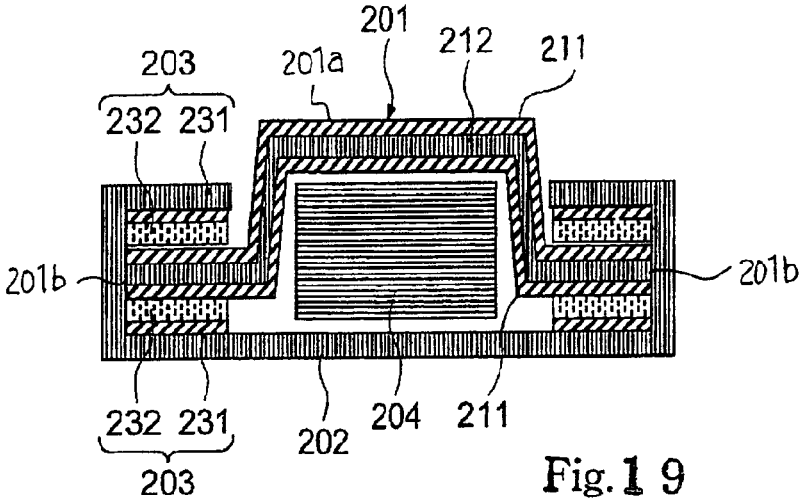
FIG. 19 is a cross sectional view taken along line A-A' of FIG. 18 and showing the structure of the non-aqueous electrolyte battery according to the present invention.

FIGS. 14A, 14B and 14C show another film packaged battery 104 according to the present invention. The film packaged battery 104 comprises a film package 530, an electrolyte cell 111 and lead terminals 112e. An upper component part 531 and a lower component part 532 form in combination the film package 530.

The lower component part 532 has a cup 532a where the electrolyte cell 111 is accommodated. In this instance, the cup has a generally rectangular parallelepiped configuration, and the side wall portions are inwardly retracted at intervals so as to form dents 143a'. For this reason, the side wall portions are waved in such a manner as to reach a vicinity of the side surfaces of the electrolyte cell 111 (see FIG. 14). The upper component part 531 has portions opposed to the innermost surfaces of the side wall portions, and the portions are fusion bonded to the innermost surfaces of the side wall portions. Thus, the film package 530 is reinforced with the waved side wall portions of the cup. Even though any presser plate is not used for the film packaged battery 104, the upper component part 531, which is fused bonded to the upper surfaces of the waved side wall portions, and keeps the upper component part flat against internally generated gas. Even if the electrolyte cell 111 is not pressed with the presser plates, the film package 530 exerts pressure on the electrolyte cell 111, and the electrodes and separator are tightly held in contact with one another.

A modification of the film packaged battery 105 has a film package 630, and the film package 630 has fusible portions 153a' around the periphery of the electrolyte cell 111. The fusible portions 153a' may be integral with the lower component part 632 or the upper component part 631. When the upper component part 631 is fusion bonded to the lower component part 632, the fusible portions 153a' are also fusion bonded to the upper component part 631 and/or lower component part 632, and reinforce the film package 630. When gas is internally generated, the gas gives rise to increase of the inner gas pressure. However, the film package 630 has been reinforced with the fusible portions 153a'. The fusible portions 153a' prevent the upper component part 631 from bulging out. Thus, the reinforced film package 630 keeps the electrodes and separator tightly held in contact with one another without any presser plates.

As will be understood from the foregoing description, the film packaged battery according to the present invention is reinforced with the increased bonded area, and is not permitted to bulge out. As a result, the electrodes and separators are held in tight contact with one another without any presser plates.

In order to keep the electrodes and separator tightly held in contact with one another, a lamination of the electrodes and separator may be wound around a core, and, thereafter, the core is removed from the center or the wound lamination. Using the wound lamination, an electrolyte cell is formed. The electrolyte cell is sealed in a film package which has a portion to bulge out when gas gives rise to increase of the inner pressure. Otherwise, the lamination of electrodes and separator may be banded with a sheet of adhesive tape, and the electrolyte cell is sealed in a film package having a portion to bulge out.

Fourth Embodiment

A non-aqueous electrolyte battery based on the fourth concept of the present invention comprises a package, an electrolyte cell, lead terminals and a sealant. These component parts are hereinbelow described in detail.

Lead Terminals

The lead terminals are made of Al, Cu, Ni, Ti, Fe, brass and stainless steel. The lead terminals may be annealed, if necessary. The thickness of the lead terminals is ranged between 20 microns to 2 millimeters. It is undesirable that the surfaces of the lead terminals are not contaminated with oil. For this reason, the lead terminals may be degreased. The lead terminals may be subjected to a surface treatment in order to enhance the adhesion to the sealant. The surfaces of the lead terminals may be roughened through a chemical etching or coated with a thin film made of polymer partially aminated phenol series, phosphate compound and titanium compound or anti-corrosion film with zinc phosphate. The lead terminals may be subjected to a surface treatment with coupling agent in titanium series or aliminate series.

Package

The package is made from a metal film or alloy film. The metal/alloy film may be made of Al, Cu, Ni, Ti, Fe, brass, or stainless steel. The metal/alloy film ranges from 20 microns thick to 1000 microns thick. The metal/alloy film may be shaped into the package shown in FIGS. 18 to 21 through a deep drawing for storing the electrolyte cell at high spacious efficiency. In case where a laminate film or laminate thin plate, which are an aluminum plate or steel plate of 30 microns thick to 500 microns thick having one or both surfaces coated with thermoplastic resin or metal adhesive resin of 5 mlcrons thick to 100 microns thick, is used for the package, any oil or lubricant is not required for the deep drawing, and the deep drawing is taken into an in-line manufacturing. It is preferable to use a metal plate with both surfaces coated with polyethylene terephthalate for a part of the package where the electrolyte cell is received. The polyethylene terephthalate may form a resin layer of 5 microns to 50 microns thick, and the metal plate may be made of aluminum ranging from 50 microns thick to 500 microns thick. The surfaces of the metal plate are not to be contaminated with oil, and, for this reason, may be degreased. In order to enhance the adhesion with the resin layer, the metal plate may be subjected to a surface treatment such as a roughing with chemical etchant, a coverage with compound of partially aminated phenol polymer, phosphate and titanium compound, a preliminary anti-corrosion treatment with zinc phosphate or a surface treatment with coupling agent in titanium series or aliminate.

Figure 23:
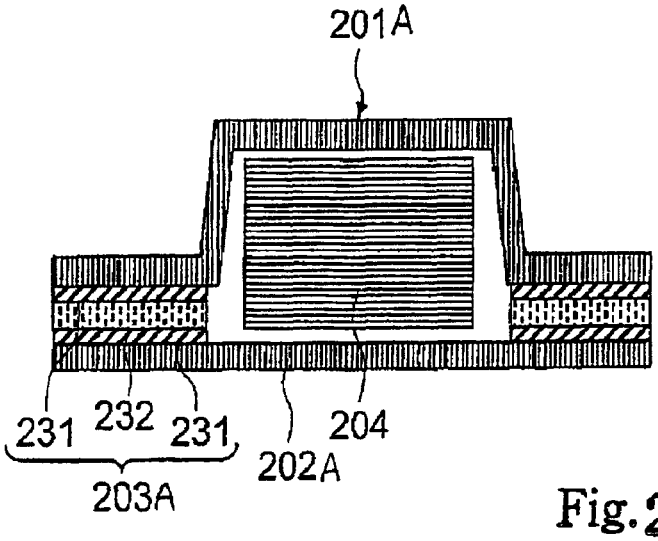
FIG. 23 is a cross sectional view showing the structure of a modification of the non-aqueous electrolyte battery according to the present invention.

A lower component part, which is shown in FIGS. 18 to 21, and upper/lower component parts, which are shown in FIG. 23, are partially made from a metal plate without any resin coating. In this instance, the metal plate may be connected to the electrolyte cell for using it as a terminal.

Figure 25:
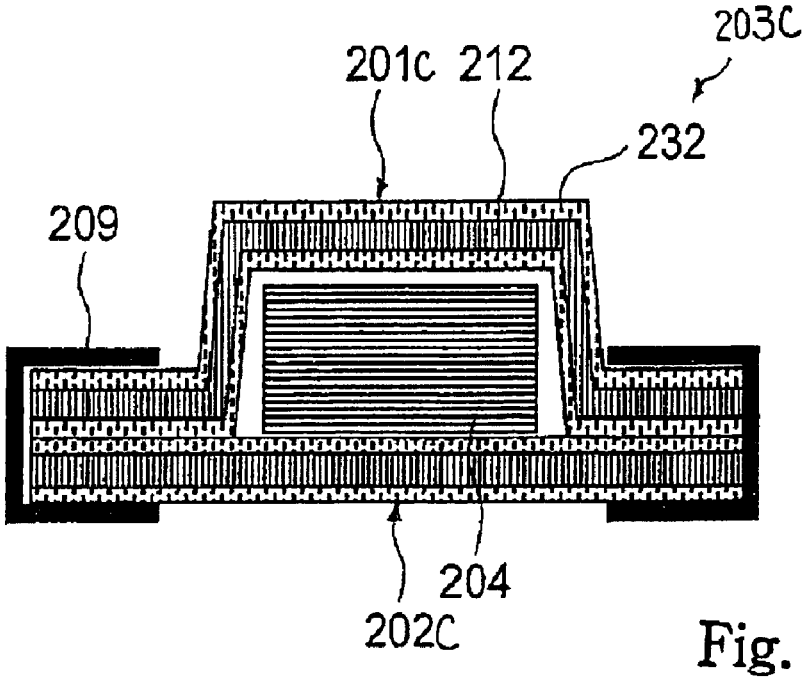
FIG. 25 is a cross sectional view showing the structure of yet another modification of the non-aqueous electrolyte battery according to the present invention.

The package shown in FIGS. 18 to 21 are fold up along both sides, which do not contain any transit portion, and the both sides of the upper component part are pinched in the fold-up side portions of the lower component part. This feature is desirable, because internally generated gas hardly breaks the pinched portions. The laminate film or laminate plate is desirable for one of the upper and lower component parts from the viewpoint of the oil free process or contamination free process, because the laminate film or laminate plate is shaped into the upper/lower component part through the deep drawing without oil. However, if a heater be directly brought into contact with the laminate plate, the resin would be adhered to the heater. In the package shown in FIGS. 18 to 21, the metal exposed component part protects the laminate plate from the heater, and the resin is never adhered to the heater. A prior art package is made from a laminate plate having the outermost resin layer made of resin having a high fusing point, and the fusion bonding is carried out at a certain point between the fusing point of the lower resin layer at the boundary to the other component part and the fusing point of the outermost resin layer. The prior art package is expensive, and requires a delicate temperature control. However, the problems are solved by using the above-described package. The metal exposed component part may be the component part partially folded up. Otherwise, metal plates may be prepared separately from the upper/lower component parts as shown in FIG. 25.

Although plural component parts are assembled into the package as shown in FIGS. 18 to 23, a sheet of material may be wounded or folded for forming packages according to the present invention.

Sealant

The sealant used for the package based on the fourth concept of the present invention includes aromatic polyester resin and barrier resin against gas in the aromatic polyester resin. The sealant may have a two-layered structure or a three-layered structure as shown in FIGS. 18 to 22. The sealant may have a portion where the barrier resin is not contained. Of course, the barrier resin may be contained in the entire portion of the sealant.

Examples of the barrier resin against gas are polyalkylene naphthalate such as polyethylene naphthalate and aromatic polyamido, because these sorts of compound have fusing point close to that of the aromatic polyester resin such as polyethylene terephthalate. When those sorts of barrier resin are mixed with the aromatic polyester resin, the mixture is homogenous, a leak path hardly takes place, and exhibits good airtight property. Polyamido containing xylene group and polyamido containing xylylene group are preferable in the aromatic polyamido from the above-described viewpoint. It is preferable that the sealant contains the gas barrier resin at 5% to 50% by weight. It is more preferable that the sealant contains the gas barrier resin at 10% to 30% by weight. As to the aromatic polyester resin, polyalkylene terephthalate, because the polyalkylene terephthalate is well fusion bonded to other component. This means that the sealant containing the polyalkylene terephthalate achieves perfect sealing and high gas barrier capability.

Dicarboxylic acid forms the ester structural unit of the polyalkylene terephthalate. Examples of the dicarboxylic acid are aromatic dicarboxylic acids such as terephthalic acid, isophthalic acid, 4,4'-diphenyldicarboxylic acid, 3,4'-diphenylcarboxylic acid, 1,4-naphthalenedicarboxylic acid, 1,5-naphthalenedicarboxylic acid, 2,5-naphthalenedicarboxylic acid, 2,6-naphthalenedicarboxylic acid, 2,6-naphthalenedicarboxylic acid and 2,7-naphthalenedicarboxylic acid. In case where an aromatic ring is provided on the diol side, aliphatic dicarboxylic acid such as succinic acid, adipic acid, sebacic acid and dodecandionn acid or dicarboxylic acid such as 1,4-cyclohexanedicarboxylic acid, 1,3-cyclohexanedicarbolylic acid, decalindicarboxylic acid and tetralindicarboxylic acid are available for the polyalkylene terephthalate.

Examples of diol, which forms the ester structural unit, are aliphatic glycol such as propylene glycol, trimethylene glycol, diethylene glycol and 1,4-buthandiol, alicyclic glycol such as 1,4-cyclohexanedimethanol, 1,3-cyclohexanedimethanol and 1,6-cyclohexandiol or bisphenol A. Xylylene-contained polyamido is a sort of polyamido produced through polycondensation between xylylenediamido-contained component and dicarboxylic acid contained component.

The xylylenediamine-contained component includes xylylenediamine as the main component, and examples of the diamine are metaxylylenediamine and paraxylylenediamine. It is preferable to use diamine component containing metaxylylenediamine at 70 mol % or more than 70 mol %. Especially, diamine component containing metaxylylenediamine at 80 mol % or more is more preferable from the viewpoint of gas barrier.

The xylylenediamine component may contain another sort of diamine except of paraxylylenediamine. Examples of another sort of diamine are aliphatic diamine such as tetramethylenediamine, pentamethylenediamine, hexamethylenediamine, octamethylenediamine and nonamethylenediamine, aromatic diamine such as paraphenylenediamine or aliphatic diamine such as 1,3-bisaminomethylcyclohexane and 1,4-bisaminomethylcyclohexane.

The dicarboxylic acid component contains $\alpha$-$\omega$ straight chain aliphatic dibasic acid as a main component. It is preferable that the $\alpha$-$\omega$ straight chain aliphatic dibasic acid has the carbon number between 6 and 12. An example of the dicarboxylic acid is aliphatic dicarboxylic acid such as adipic acid, succinic acid, glutaric acid, pimelic acid, suberic acid, azelaic acid, sebacic acid, undecanoic diacid and dodecane diacid, and aromatic dicarboxylic acid such as terephthalic acid, isophthalic acid and 2,6-naphthalene dicarboxylic acid is blended in so far as it does not destroys the particular features of the present invention.

The aromatic polyester resin and the gas barrier resin in the aromatic polyester resin series are fused and mixed for forming the sealant used in the battery based on the fourth concept of the present invention. Otherwise, solid-state aromatic polyester resin and solid-state aromatic polyester resin may be mixed before supplying the mixture in a melting blender. The melted mixture may be formed in a sheet of sealant film. Examples of the melting blender are forming apparatus for plastic products such as an extruder and an injection molding machine.

The sealant may have a multi-layered structure. In this instance, the resin layer containing the aromatic polyester resin and gas barrier resin in the aromatic polyester series may be laminated with another resin layer or layers. A metal adhesive resin layer may serve as another layer or one of the layers. It is preferable that the gas barrier layer ranges from 10 microns thick to 100 microns thick. In case where the metal adhesive resin layer is incorporated in the multi-layered structure, the metal adhesive resin layer rages from 5 microns thick to 50 microns thick. An example of the metal adhesive resin layer is polyethylene terephthalate. The metal adhesive resin layer may be made of polyethylene terephthalate, only, or blended with another sort of component. However, the component is fallen within the range between zero % and 50 weight %. The metal adhesive resin may be copolymerized polyester resin containing ethylene terephthalate as the main component. In this instance, the other component except the ethylene terephthalate ranges from zero to 50 weight %. The blended component and copolymerized component are butylene terephthalate/polybutylene terephthalate, ethylene isophthalate/polyethylene isophthalate, ethylene sebacate/polyethylene sebacate, ethylene adipate/polyethylene adipate and poly(oligo(oxitetramethylene)-terephthalate), i.e., polyester having oxialkylene as a repeated unit.

Part of the inner surface or the entire inner surface is coated with the sealant. In case where sheets of the laminate film contain the gas barrier resin so as to serve as the sealant, the sheets of the laminate film are directly fusion bonded to each other without any piece of sealing film.

Electrolyte Cell

There is not any limit on the structure of the electrolyte cell 204. The electrolyte cell 204 comprises a positive electrode, a negative electrode and a separator. These components may be formed in a plate. Otherwise, more than two sets are laminated, an elongated set is wound, or an elongated narrow set is wound for forming a flat coil. The positive electrode is to absorb cation or discharge anion. The positive electrode contains active substance, and binder and other functional additives may be further contained. Any known material is available for the positive electrode. Examples are (1) metal oxides such as, for example, $LiMnO_2$, $LiMn_2O_4$, $LiCoO_2$ and $LiNiO_2$, (2) conductive high molecular compounds such as, for example, poly-acetylene and poly-aniline and (3) disulfido compounds expressed by general formula $(R—S_m)_n$ where R is aliphatic group or aromatic group, S is sulfur, m is an integer equal to or greater than 1 and n is an integer equal to or greater than 1. Examples of the disulfido compound are dithiogylcol, 2,5-dimercapto-1,3,4-thiadiazole and S-triazine-2,4,6-trithiol. An example of the binder is halogen-contained high molecular compound such as, for example, polyfluorovinylidene. A functional additive may enhance the electron conductivity, and examples of the functional additive are conductive high-molecular compound such as acetylene black, polypyrrole and polyaniline. Another functional additive may enhance the ion conductivity, and high molecular electrolyte is an example of the additive. More than one sort of additives may be contained in the positive electrode.

The negative electrode contains active material. Any known active material is available for the negative electrode in so far as the cation is accumulated and discharged. Examples of the active material are natural graphite, crystal carbon such as, for example, graphitized carbon, which is produced from coal or petroleum pitch through a high temperature heat process, and amorphous carbon which is produced from coal, petroleum pitch, acethylene pitch coke and lithium alloy such as metal lithium and AlLi.

The electrolyte, which is contained in the electrode group, is, by way of example, salt dissolved in basic solvent with high polarity. The solvent may be ethylene carbonate, propylene carbonate, dimethyl carbonate, diethyl carbonate, methylethyl carbonate, γ-butyrolactone, N,N'-dimethylformamido, dimethylsulfoxide, N-methylpyrrolidone and m-cresol. The salt may contain cation of alkaline metal such as Ki, K and Na and anion of halogen-contained compound such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. One sort of salt may be dissolved into one sort of solvent. Otherwise, more than sort of salt is dissolved into mixture of more than one sort of solvent. Polymer gel, which contains the electrolyte, is available for the electrolyte. A small amount of sufloran, dioxan, dioxoran, 1,3-propansultone, tetrahydrofuran and vinylenecarbonate may be added to the electrolyte.

The third concept of the present invention is applicable to thin film packaged flat devices such as, for example, electric double layer capacitors, electrolyte capacitors and various sorts of sensors as well as the film packaged battery. The above-described lead terminals, film package and electrolyte cell may be combined with other component parts of the batteries based on the first, second and third concepts of the present invention.

Structure

Referring to FIGS. 18 to 21 of the drawings, a film packaged non-aqueous electrolyte battery based on the fourth concept comprises a package, i.e., an upper component part 201 and a lower component part 202, an electrolyte cell 204 sealed in the package 201/202, sheets of sealant 203 sandwiched between the upper component part 201 and the lower component part 202 and lead terminals 205. The upper component part 201 has a metal layer 212 sandwiched between metal adhesive resin layers 211, and a cup 201a is formed through a deep drawing. A brim 201b takes place around the cup 201a. On the other had, the lower component part 202 is made from a metal plate, which is not coated with any resin layer. The lower component part 202 is twice bent or fold up along both sides, and the side portions of the lower component part 202 form elongated pockets. The electrolyte cell 204 is received in the cup 201a, and the lead terminals 205 are connected at inner ends thereof to the electrolyte cell 204, and the outer end portions of the lead terminals 205 project through the sheets of sealant 203 to the outside of the package 201/202. Thus, the lead terminals 205 project from both ends of the package 201/202 in directions opposite to each other. The sheets of sealant 203 are inserted between the brim 201b of the upper component part 201 and the peripheral portion of the lower component part 202, and the upper component part 201, sheets of sealant 203 and lower component part 202 are fusion bonded to one another.

Figure 20:
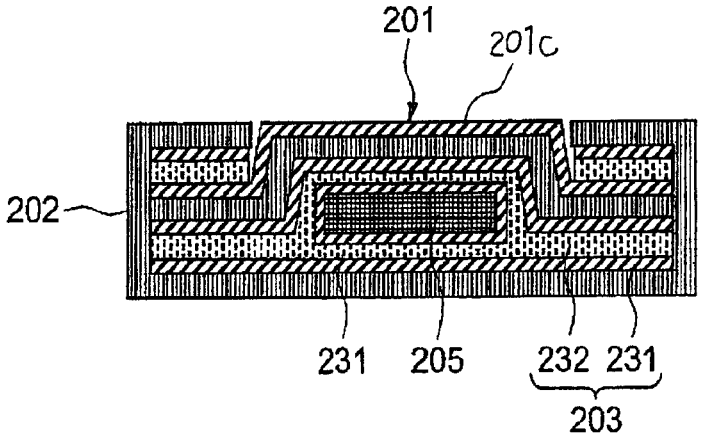
FIG. 20 is a cross sectional view taken along line B-B' of FIG. 18 and showing the structure of the non-aqueous electrolyte battery according to the present invention.
Figure 21:
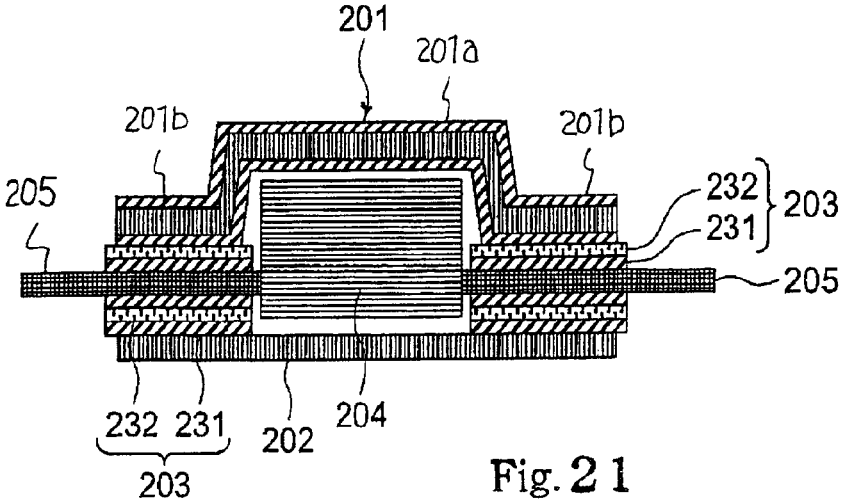
FIG. 21 is a cross sectional view taken along line C-C' and showing the structure of the non-aqueous electrolyte battery according to the present invention.
Figure 22:
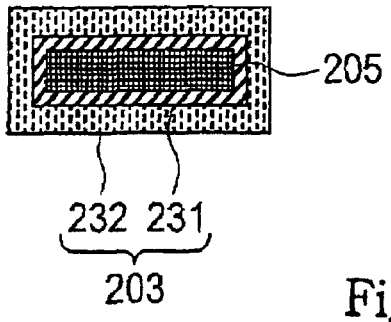
FIG. 22 is a cross sectional view showing the structure of a sealant.

The sheets of sealant 203 are made from the metal adhesive resin layers and the gas barrier resin layers fusion bonded to one another. The adhesive resin layers and the gas barrier layers are made of compound in polyethylene terephthalate. At least the gas barrier layers contain the gas barrier resin. The metal adhesive resin layers are fusion bonded to the lower component parts 202, and the gas barrier layers are fusion bonded to the metal adhesive resin layers 211 of the upper component part 201. The sheets of gas barrier layer are further fusion bonded to the lead terminals 205 as shown in FIG. 20. In order to wrap the lead terminals 205 in the sealant 203, it is preferable to wrap intermediate portions of the lead terminals 205 in sheets of sealant 203, which are same as the sheets of sealant 203, before sealing the electrolyte cell 204 in the package 201/202 as shown in FIG. 22. The intermediate portions of the lead terminals 205 are wrapped in the sheets of sealant 203, and the sheets of sealant 203 are fusion bonded to the intermediate portions of the lead terminals 205. The intermediate portions wrapped in the sealant 203 are so thick that both end portions 201c of the upper component part 201 bulge out as will be see in FIGS. 18 and 20. While the resin is being fused, the melted resin is allowed to stay in the bulge end portions 201c. This feature is desirable, because solidified resin prevents the metal layer of the upper component from direct contact with the lead terminals 205.

The non-aqueous electrolyte battery based on the fourth concept of the present invention has various modifications. One of the modifications is shown in FIG. 23. The cross section shown in FIG. 23 is taken along line corresponding to line A-A' in FIG. 18. In the first modification, both of the upper and lower component parts 201A/202A are made from sheets of metal without any resin coating, and a sheet of sealant 203A has three-layered structure, i.e., a gas barrier layer 232 sandwiched between metal adhesive layers 231. When the electrolyte cell 204 is sealed in the package 201A/202A, heat is applied to the sealant 203A, and the metal adhesive layers 231 are fusion bonded to the peripheries of the upper/lower component parts 201A/202A. A cup is formed in the upper component part 201A through a deep drawing as similar to the upper component part 201. However, the lower component part 202A is not folded up.

Figure 24:
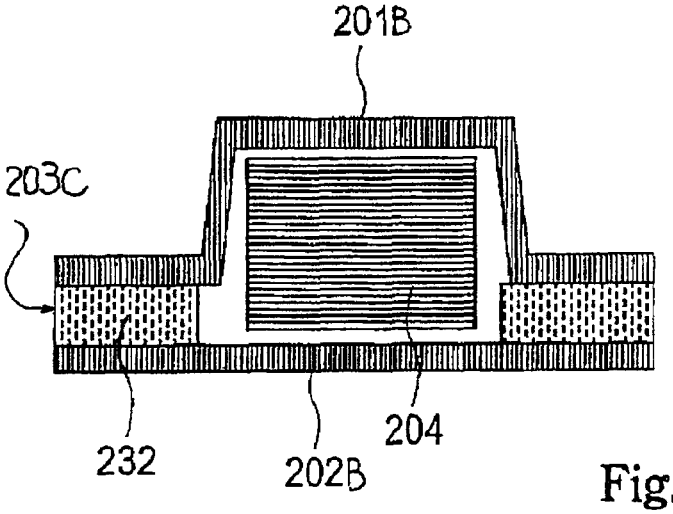
FIG. 24 is a cross sectional view showing the structure of another modification of the non-aqueous electrolyte battery according to the present invention.

FIG. 24 shows another modification of the non-aqueous electrolyte battery based on the fourth concept of the present invention. The cross section shown in FIG. 24 is taken along a line corresponding to line A-A' of FIG. 18. Both of the upper and lower component parts 201B/202B are made of metal, and are not coated with any resin layer. A sheet of sealant 203C is sandwiched between the upper component part 201B and the lower component part 202B, and is made of the gas barrier resin, only. The sheet of sealant 203C is fusion bonded to the peripheries of the upper/lower component parts 201B/202B.

FIG. 25 shows yet another modification of the non-aqueous electrolyte battery based on the fourth concept of the present invention. The cross section shown in FIG. 25 is taken along a line corresponding to line A-A' of FIG. 18. The upper/lower component parts 201C/202C are made from sealant coated metal plates. Metal plates 212 are coated with the gas barrier resin 232, and the gas barrier resin layers are fusion bonded to each other without any sheet of sealing layer. Thus, the sheets of gas barrier resin layers 232 serve as the sealant. Both side portions of the upper/lower component parts 201C/202C are secured to each other by means of metal clips 209, which are shaped like a channel, and the gas barrier resin layers 232 are further fusion bonded to the metal clips 209. Tough not shown in the drawings, intermediate portions of the lead terminals are wrapped in sheets of gas barrier resin layers, respectively.

In the modifications shown in FIGS. 24 and 25, it is desirable that the gas barrier resin layers are adhesive to metal. However, the gas barrier resin layers of the other batteries shown in FIGS. 18 to 23 may not be adhesive to metal.

When gas is generated, the gas gives rise to increase of the inner pressure. However, the seal of the packages 201/202, 201A/202A, 201B/202B and 201C/202C are hardly broken by virtue of the sealant 203/203A/203B/203C. The non-aqueous electrolyte battery based on the fourth concept of the present invention is durable and highly reliable.

Figure 26:
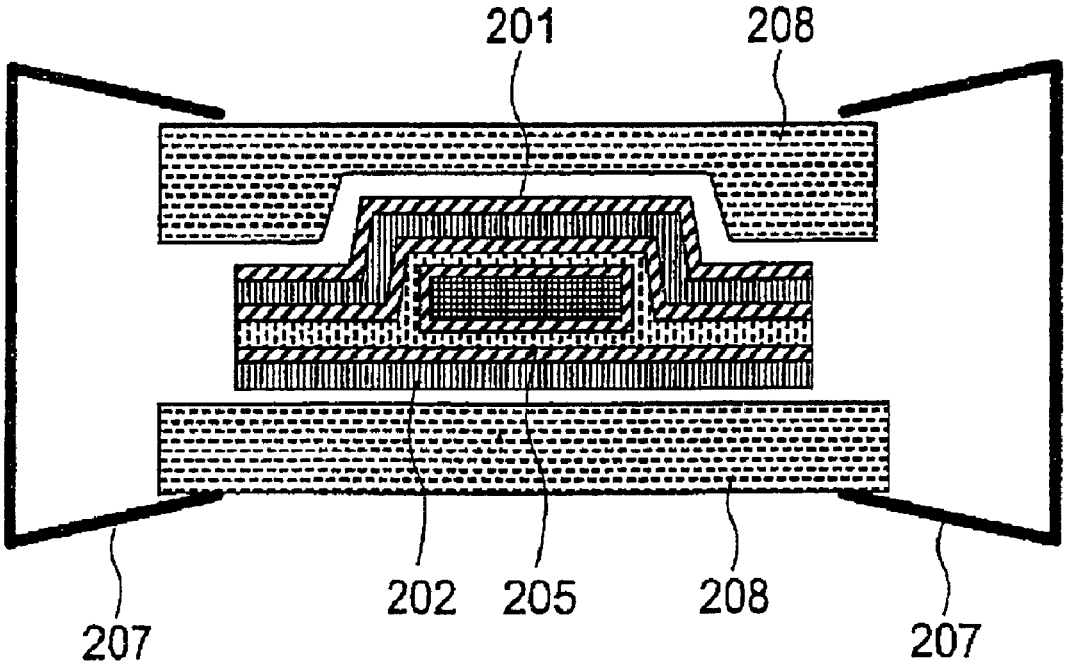
FIG. 26 is a cross sectional view showing the structure of a modification of the battery according to the present invention.

FIG. 26 shows a modification of the battery. A laminate film with a cup 201 and an aluminum plate 202 are assembled together, and a sheet of sealant 205 is sandwiched therebetween. The structure is inserted into a gap in a pack case 208, and the pack case 208 is pressed to the structure by means of spring clips 207.

Figure 27:
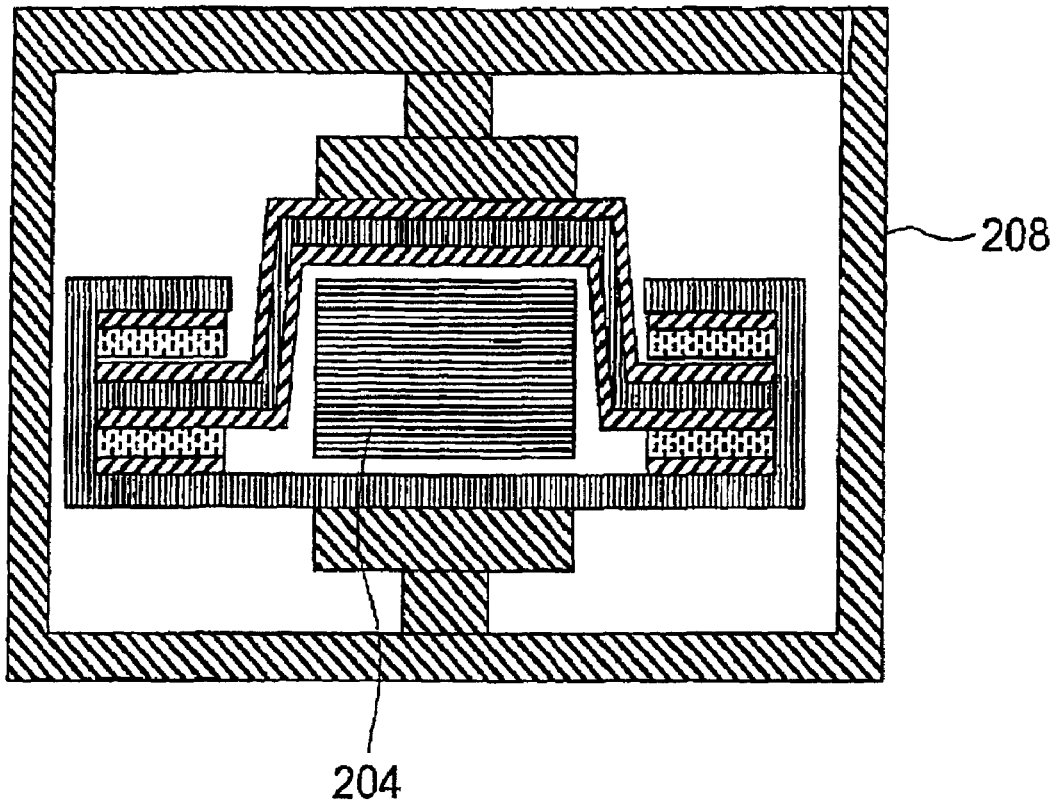
FIG. 27 is a cross sectional view showing the structure of another modification of the battery according to the present invention.

FIG. 27 shows another modification of the battery. The electrolyte cell 204 is sealed in a package, and the package is retained by a pack case 208.

EXAMPLES OF BATTERIES

The present inventors fabricated samples of the batteries based on the first, second, third and fourth concept of the present invention, and evaluated as follows. The samples do not set any limit on the technical scope of the present invention.

First Example

Powder of lithium manganate with spinel structure, carbonaceous conductivity imparting material and polyvinylidenefluoride were dispersed and blended in NMP (N-methyl-2-oyrrolidone) at weight ratio of 90:5:5. The mixture was agitated so that slurry was obtained. The amount of NMP was regulated in such a manner that the viscosity of the slurry was spread by using a doctor blade. The slurry was uniformly spread over a surface of an aluminum foil of 20 microns thick with the doctor blade for forming a positive collector. While the slurry was being spread, non-coated portions took place like strips. The slurry was dried in vacuum at 100 degrees in centigrade for 2 hours. The slurry was similarly spread on the other surface, and was dried in vacuum. The non-coated portions on the surfaces were overlapped with one another. The aluminum foil coated with the active material was subjected to a roll pressing, and eight rectangular plates were cut from it. The non-coated portions were to be connected to the inner end portions of the lead terminals. Thus, the eight rectangular plates serves as positive collector layers, and formed in combination a positive electrode. The total theoretic capacitance of the positive electrode was 3 Ah.

On the other hand, amorphous carbon powder and polyvinylidenefluoride were dispersed in NMP at weight ratio of 91:9, and the mixture was agitated so as to obtain slurry. The viscosity was regulated in such a manner that the slurry was spread with the doctor blade. The slurry was spread over a surface of copper foil of 10 microns thick with the doctor blade for a negative collector. Non-coated portions took place like stripes. The slurry was dried in vacuum at 100 degrees in centigrade for 2 hours. The thickness of the active material was regulated in such a manner that the theoretic capacitance per unit area on the negative collector and the theoretic capacitance per unit area on the positive collector was 1:1. The slurry was spread over the other surface of the copper foil. The resultant sheet was subjected to the roll pressing, and 9 rectangular plates were cut from the resultant sheet. The nine rectangular plates were longer in both width and length than the eight plates by 2 millimeters. The non-coated portions were to serve as the connected portions to the lead terminal. The nine rectangular plates or nine negative collector layers formed in combination a negative electrode. Thus, the negative electrode was prepared.

The eight positive collector layers were alternated with the nine negative collector layers, and sixteen micro-porous separator layers were inserted between the positive collector layers and the negative collector layers. The micro-porous separator layers were longer in both length and width than the negative collector layers by 2 millimeters. The micro-porous separator layers were manufactured by Hoechst Celanese Corporation, and were sold as Celgard 2300. The negative collector layers were exposed to both outer surfaces of the lamination, and two more separator layers were laminated on the outermost negative collector layers, respectively. The non-coated portions of the positive collector layers were opposed to the non-coated portions of the negative collector layers. Thus, an electrolyte cell was obtained.

An aluminum positive lead terminal, which was 0.1 millimeter thick, 50 millimeters wide and 50 millimeters long, was connected to the non-coated portions of the eight positive collector layers by using an ultrasonic welding technique. A nickel negative lead terminal, which was 0.1 millimeter thick, 50 millimeters wide and 50 millimeters long, was connected to the non-coated portions of the nine negative collector layers by using the ultrasonic welding technique. Sheets of sealant had been made of modified polypropylene resin, and were 30 microns thick. Intermediate portions of the positive/negative lead terminals were wrapped with the sheets of sealant, and the sheet of sealant were fusion bonded to the intermediate portions. The positive/negative lead terminals were bend like a crank as shown in FIG. 5. The outer portions of the positive/negative lead terminals were slightly higher than the uppermost micro-porous separator layer.

A sheet of laminate film, which had a nylon layer of 25 microns thick, soft aluminum layer of 40 microns thick and modified polypropylene layer of 30 microns thick, was prepared. A piece of laminate film was cut from the sheet, and was placed on a die. The modified polypropylene was directed to a punch. The piece of laminate film was shaped into a lower component part with a cup through a deep drawing. The depth of the cup was slightly greater than the thickness of the electrolyte cell. The punch was substantially as wide as the area of the uppermost/lowermost surfaces of the electrolyte cell. The die was wider in each direction for the lead terminal by 10 millimeters and in the perpendicular direction by 1 millimeter on each side. The lower component part with the cup was obtained through the deep drawing. The lower component part was trimmed so that the brim of 10 millimeter wide was left around the cup. The lower component part was maintained in such a manner that the cup was downwardly directed, and the electrolyte cell was put in the cup. The pieces of sealant around the intermediate portions of the lead terminals were held in contact with the brim of the lower component part.

Another piece of laminate film was cut from the sheet for the upper component part, and was not shaped through the deep drawing. The periphery of the upper component part was aligned with the periphery of the brim. The cup was closed with the piece of laminate film, and the pieces of sealant were sandwiched between the brim of the lower component part and the peripheral portion of the upper component part.

First, the pieces of sealant were fusion bonded to the short end portions, which contained the transit portions, of the upper/lower component parts, and, thereafter, one of the side portions of the upper/lower component parts was fusion bonded by using a heat sealing technique. The conditions of the heat sealing were determined such that the lead terminals were never in contact with the aluminum layers of the upper/lower component parts.

$LiPF_6$ was dissolved in solvent at 1 mol/litter for producing liquid electrolyte. The solvent contained propylene carbonate and methyl-ethyl carbonate at 50:50 by weight. The fusion bonded side portion of the package was inclined toward the ground, and the liquid electrolyte was injected into the electrolyte cell through the other non-fusion bonded side portion of the package. The amount of injected liquid electrolyte was equivalent to 5 volume % of the electrolyte cell. After the injection, degassing was carried out in vacuum. The package was inserted into a vacuum sealing apparatus, and the non-fusion bonded side portion of the package was bonded in vacuum by using the heat sealing. After the heat sealing in vacuum, the upper component part was inwardly warped. Thus, the sample of the battery was obtained.

Other two samples were fabricated as similar to the sample, and the three samples were piled up. The lead terminals of the samples were electrically connected by means of the metal interconnections as similar to the battery shown in FIGS. 6 and 7. Three samples were further fabricated as similar to the sample described hereinbefore, and were inverted. The inverted samples were piled up, and the lead terminals were electrically connected by means of the conductive interconnections. Thus, a first comparative sample was obtained.

The present inventors further fabricated a second comparative sample, which was similar to the battery shown in FIG. 1A, as follows. The positive collector layers and negative collector layers were produced similar to those of the sample except that 25% of the non-coated portions was gathered in "ear-like" areas in the vicinity of one of the long ends, and the "ear-like" areas of the positive electrode were positioned on the opposite short end of the "ear-like" areas of the negative electrode. However, the ear-like areas of the positive electrode were close to the same long ends as the ear-like areas of the negative electrode. The negative collector layers were alternated with the positive collector layers, and the separator layers are inserted between the gaps between the negative collector layers and the positive collector layers. The outermost negative collector layers were covered with other two separator layers. An aluminum positive lead terminal, which was 0.1 millimeter thick, 10 millimeters wide and 50 millimeters long, was connected at the inner end thereof to the non-coated portions of the eight positive collector layers by using the ultrasonic welding technique, and a nickel negative lead terminal, which was 0.1 millimeter thick, 10 millimeters wide and 50 millimeters long, was connected at the inner end portion thereof to the non-coated portions of the nine negative collector layers through the ultrasonic welding. Prior to the ultrasonic welding, intermediate portions of the positive/negative lead terminals were wrapped in sheets of sealant made of the modified polypropylene. The sheets of sealant were 30 microns thick.

A sheet of laminate film, which consisted of nylon layer of 25 microns thick, soft aluminum layer of 40 microns thick and modified polypropylene layer of 30 microns thick, was prepared. A piece of the laminate film was cut from the sheet, and a cup was formed in the piece of laminate film by using the deep drawing. The piece of laminate film was put in such a manner that a punch was brought into contact with the modified polypropylene layer. The depth of the cup was half of the height of the laminated electrodes and separator. The peripheral portion around the cup was trimmed so as to leave the brim of 10 millimeters wide.

Another sheet of laminate film was also cut from the sheet, and a cup was formed therein. The periphery around the cup was trimmed such that a brim was left around the cup.

The lamination of electrodes and separator was put in the cup, and the sheets of sealant were bought into contact with the brim around the cup. The lead terminals projected in parallel from one of the short ends. The lamination of electrodes and separator was confined in the cups, and the lead terminals were sandwiched between the brims. The short ends and one of the long ends were bonded by using the heat sealing. The bonded long end was inclined to the ground, and the liquid electrolyte, which was same as the liquid electrolyte injected into the sample, was injected through the non-bonded ling end into the lamination of electrodes and separator. The amount of injected liquid electrolyte was equivalent to 5 volume % of the lamination. After the degassing, the non-bonded long side portion was closed by using the heat sealing in vacuum. Three batteries thus fabricated were piped up in such a manner that the positive lead terminals overlapped with the negative lead terminals. The lead terminals were electrically connected through conductive interconnections. Thus, the second comparative sample was obtained.

The sample and comparative sample were horizontally placed on a plate, and were maintained in high-temperature high-humidity ambience for 30 days. The high-temperature high-humidity ambience was 60 degrees in centigrade and 90% in relative humidity. The present inventors confirmed that gas was generated in the sample and first and second comparative samples.

After 30 days, the present inventors observed the sample, first comparative sample and second comparative sample to see whether electrolyte had been leaked from the transit portions and whether or not any precipitation was found around the transit portions. When the leakage or precipitation was observed around at least one of the six transit portions, the sample or comparative sample was judged as "leaked". The result was summarized in table 1.

TABLE 1

| | Order of Leakage | Leaked Portion |
|---|---|---|
| Sample | Not Leaked | — |
| $1^{st}$ comparative sample | Leaked Firstly | Around positive lead terminal of the lowest battery |
| $2^{nd}$ comparative sample | Leaked Secondary | Around positive lead terminal of the lowest battery |

The electrolyte was not leaked from the sample. The sample had the intermediate portions of the lead terminals slightly higher than the uppermost surface of the electrolyte cell. The internally generated gas was accumulated in the upper portion of the space, and the transit portions were purged with the gap. The transit portions were not exposed to the electrolyte, and were not deteriorated. On the other hand, the transit portions of the first and second comparative examples were attacked by the electrolyte, and were deteriorated. The transit portions peeled off from the lead terminals, and the electrolyte was leaked therethrough. The present inventors concluded that the relative position between the transit portions and the electrolyte cell was effective against the leakage of the electrolyte.

Second Example

Powder of lithium manganate with spinel structure, carbonaceous conductivity imparting material and polyvinylidenefluoride were dispersed and blended in NMP at weight ratio of 90:5:5. The mixture was agitated so that slurry was obtained. The amount of NMP was regulated in such a manner that the viscosity of the slurry was spread by using a doctor blade. The slurry was uniformly spread over a surface of an aluminum foil of 20 microns thick with the doctor blade for forming a positive collector. While the slurry was being spread, non-coated portions took place like strips. The slurry was dried in vacuum at 100 degrees in centigrade for 2 hours. The slurry was similarly spread on the other surface, and was dried in vacuum. The non-coated portions on the surfaces were overlapped with one another. The aluminum foil coated with the active material was subjected to a roll pressing, and eight rectangular plates were cut from it. The non-coated portions were to be connected to the inner end portions of the lead terminals. Thus, the eight rectangular plates serves as positive collector layers, and formed in combination a positive electrode. The total theoretic capacitance of the positive electrode was 3 Ah.

On the other hand, amorphous carbon powder and polyvinylidenefluoride were dispersed in NMP at weight ratio of 91:9, and the mixture was agitated so as to obtain slurry. The viscosity was regulated in such a manner that the slurry was spread with the doctor blade. The slurry was spread over a surface of copper foil of 10 microns thick with the doctor blade for a negative collector. Non-coated portions took place like stripes. The slurry was dried in vacuum at 100 degrees in centigrade for 2 hours. The thickness of the active material was regulated in such a manner that the theoretic capacitance per unit area on the negative collector and the theoretic capacitance per unit area on the positive collector was 1:1. The slurry was spread over the other surface of the copper foil. The resultant sheet was subjected to the roll pressing, and 9 rectangular plates were cut from the resultant sheet. The nine rectangular plates were longer in both width and length than the eight plates by 2 millimeters. The non-coated portions were to serve as the connected portions to the lead terminal. The nine rectangular plates or nine negative collector layers formed in combination a negative electrode. Thus, the negative electrode was prepared.

The eight positive collector layers were alternated with the nine negative collector layers, and sixteen micro-porous separator layers were inserted between the positive collector layers and the negative collector layers. The micro-porous separator layers were longer in both length and width than the negative collector layers by 2 millimeters. The micro-porous separator layers were manufactured by Hoechst Celanese Corporation, and were sold as Celgard 2300. The negative collector layers were exposed to both outer surfaces of the lamination, and two more separator layers were laminated on the outermost negative collector layers, respectively. The non-coated portions of the positive collector layers were opposed to the non-coated portions of the negative collector layers. Thus, a lamination of electrodes and separator was obtained for an electrolyte.

An aluminum positive lead terminal, which was 0.1 millimeter thick, 50 millimeters wide and 50 millimeters long, was connected to the non-coated portions of the eight positive collector layers by using an ultrasonic welding technique. A nickel negative lead terminal, which was 0.1 millimeter thick, 50 millimeters wide and 50 millimeters long, was connected to the non-coated portions of the nine negative collector layers by using the ultrasonic welding technique. Sheets of sealant had been made of modified polypropylene resin, and were 30 microns thick. Intermediate portions of the positive/negative lead terminals were wrapped with the sheets of sealant, and the sheet of sealant were fusion bonded to the intermediate portions. The positive/negative lead terminals were bend like a crank as shown in FIG. 5. The outer portions of the positive/negative lead terminals were slightly higher than the uppermost micro-porous separator layer.

A sheet of laminate film, which had a nylon layer of 25 microns thick, soft aluminum layer of 40 microns thick and modified polypropylene layer of 30 microns thick, was prepared. A piece of laminate film was cut from the sheet, and was placed on a die. The modified polypropylene was directed to a punch. The piece of laminate film was shaped into a lower component part with a cup through a deep drawing. The product between the area of the punch and the depth, i.e., the recess formed through the deep drawing was 124% of the lamination of electrodes and separator before the connection with the lead terminals. The punch had the length greater than the length of the lamination by 16 millimeters and the width greater than the width of the lamination by 6 millimeters. The depth of the recess was slightly greater than the height of the electrolyte cell, and was equal to the distance between a virtual plane where the outer portions of the lead terminals were and the bottom surface of the electrolyte cell. After the deep drawing, the periphery of the piece of laminate film was trimmed so that a brim took place around the cup. The brim was 10 millimeters wide. The lower component part was maintained in such a manner that the cup was downwardly directed, and the electrolyte cell was put in the cup. The pieces of sealant around the intermediate portions of the lead terminals were held in contact with the brim of the lower component part. The lamination of electrodes and separator was located in the central zone of the recess, and the four ends of the upper surface of the lamination were spaced from the four side surfaces defining the recess by 8 millimeters, 3 millimeters, 8 millimeters and 3 millimeters, respectively.

Another piece of laminate film was cut from the sheet for the upper component part, and the periphery of the upper component part was aligned with the periphery of the brim. The piece of laminate film was not shaped through the deep drawing. The cup was closed with the piece of laminate film, and the pieces of sealant were sandwiched between the brim of the lower component part and the peripheral portion of the upper component part.

Figure 28:
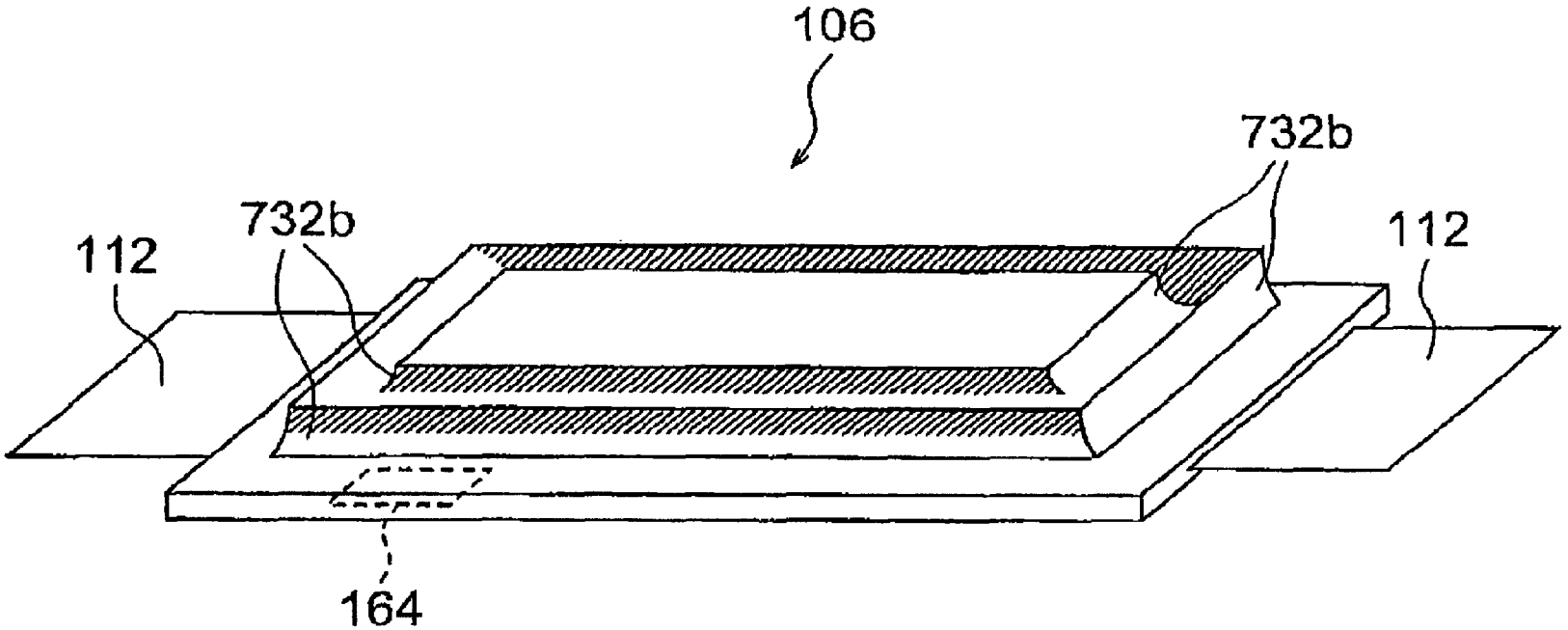
FIG. 28 is a perspective view showing the structure of a second example of the battery according to the present invention.

First, the pieces of sealant were fusion bonded to the short ends, which contained the transit portions, of the upper/lower component parts, and, thereafter, one of the long side portions of the upper/lower component parts was fusion bonded by using a heat sealing technique. A piece 164 of polyethylene terephtalate, which was a square of 10 millimeters by 10 millimeters and was 5 microns thick, had been sandwiched between the long side portions (see FIG. 28). The piece of polyethylene terephtalate was expected to serve as a relief valve. The piece of polyethylene terephthalate was to be separated from the long side portions for leaving abnormally Increased gas pressure. The conditions of the heat sealing were determined such that the lead terminals were never in contact with the aluminum layers of the upper/lower component parts.

$LiPF_6$ was dissolved in solvent at 1 mol/litter for producing liquid electrolyte. The solvent contained propylene carbonate and methyl-ethyl carbonate at 50:50 by weight. The fusion bonded side portion of the package was inclined toward the ground, and the liquid electrolyte was injected into the electrolyte cell through the other non-fusion bonded side portion of the package. The amount of injected liquid electrolyte was equivalent to 5 volume % of the electrolyte cell. After the injection, degassing was carried out in vacuum. The package was inserted into a vacuum sealing apparatus, and the non-fusion bonded side portion of the package was bonded in vacuum by using the heat sealing. After the heat sealing in vacuum, the vacuum, which had been developed in the vacuum sealing apparatus, was broken. When the atmospheric pressure was exerted on the package, the clearance, with which the lamination of electrodes and separator was spaced from the inner surfaces of the package by 8 mm, 3 mm, 8 mm and 3 mm, was crushed as indicated by reference 723b, and the upper component part was inwardly warped also as indicated by reference 723b (see FIG. 28). As a result, the upper component part became lower than the transit portions. Thus, the sample 106 of the battery was obtained.

Figure 29:
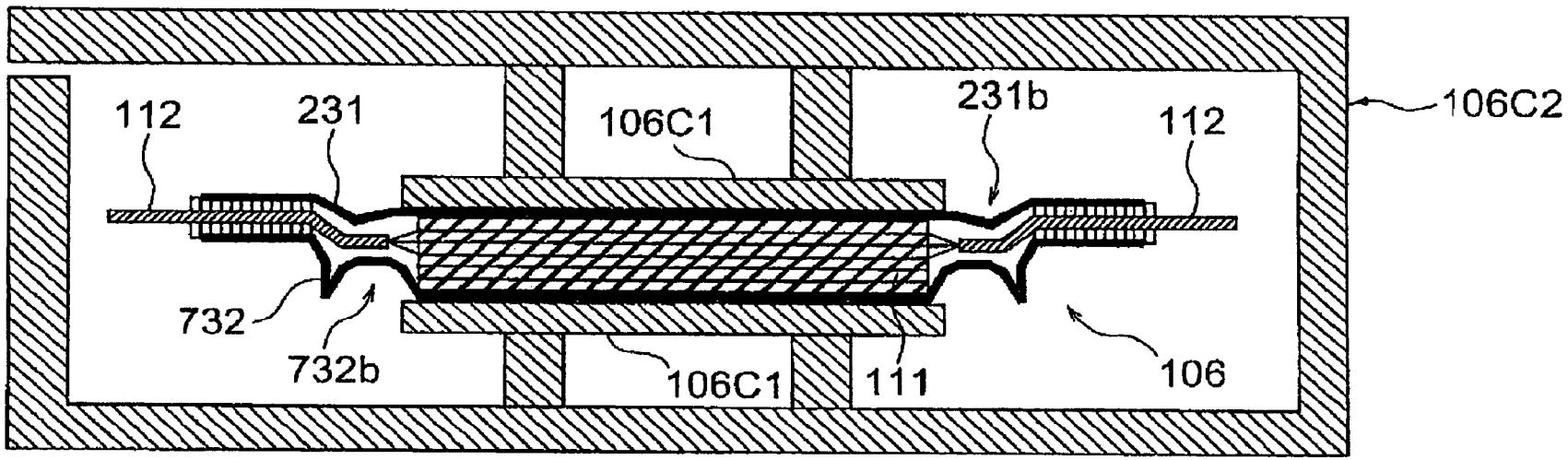
FIG. 29 is a schematic cross sectional view showing an example of the battery retained by a pack case.

The battery 106 was retained by a pack case 106C2 as shown in FIG. 29. The cup was directed downwardly. The pack case 106C2 had presser plates 106C1, which were as wide as the electrolyte cell 111, and the presser plates 106C1 were connected through poles to a frame. Although only two poles were shown in FIG. 29 between the presser plate 106C1 and the frame, four poles were provided between the presser plate 106C1 and the frame. The frame was made of polyester resin, and the presser plates 106C1 were made of bakelite. The frame had resiliency so that the presser plates 106C1 exerted pressure to the battery 106, and the positive/negative collector layers and separator layers were tightly held in contact with one another.

The battery 106 was repeatedly charged and discharged between 3 volts -4.8 volts at 3 amperes. In detail, the battery 106 was charged to 4.8 volts, kept the charged voltage for 2 hours, and, thereafter, was discharged at constant current. Since, the charged voltage, i.e., 4.8 volts was out of the normal operating range, the test was hereinbelow referred to as "excess cycle test".

The present inventors repeated the excess cycle test. The crushed portion 732b of the lower component part gradually returned to the initial shape, i.e., the lower component part immediately after the deep drawing, and, thereafter, the crashed portion 732b and warped portion 231b bulged out. However, the portions of the package which were held in contact with the presser plates 106C1 did not bulge out. The present inventors continued the excess cycle test. The bulge portion was tightly stretched, and the gas pressure was raised. When the excess cycle test reached 300 cycles, the gas was blown out through the relief valve. Nevertheless, the charge/discharge cycle capacity was not changed.

Third Example

A third sample was fabricated as similar to the second same. However, the third sample was not retained by the pack case. This meant that the electrolyte cell was not pressed by the presser plates.

The third sample was subjected to the excess cycle test. The crushed portion 732b and warped portion 231 gradually returned to the initial shapes. When the charge/discharge reached certain cycles close to 200 cycles, the package started to bulge out. The present inventors continued the excess cycle test, and the gas pressure was increased. When the charge/discharge cycle reached 400, the gas was blown out through the relief valve. Although the charge/discharge cycle capacity was not varied until the package had returned the initial shape, the charge/discharge cycle capacity was decreased after the package started to bulge out. When the gas was blown out, the charge/discharge cycle capacity was reduced to 20% of the initial charge/discharge cycle capacity.

Fourth Example

A fourth example was fabricated in a similar manner to the second example except that the positive/negative collector layers were adhered to the separator layers. The adhesive compound was prepared as follows. 1,2-polybutadiene and lauroyl peroxide were dissolved in toluene at 5 weight % and 0.1 weight %, respectively. The polybutadiene was sold by JSR as RB810. The polybutadiene had 1,2 bond ratio at 90%, the fusing point was 71 degrees in centigrade, and the mean molecular weight was between a hundred thousand and two hundred thousand.

The solution was sprayed to both surfaces of the separator layers, and was dried. The solution formed spots of adhesive compound on the surfaces of the separator layers. The present inventors observed the adhesive compound spots, and confirmed that the adhesive compound spots occupied about 2% of the total area of each surface. The positive/negative collector layers were alternated with the separator layers, and the lamination was pressed by using a hot bench pressing machine. The lamination was preliminary heated to 80 degrees in centigrade for 5 minutes. Thereafter, the lamination was pressed at 5 $kg/cm^2$ at 80 degrees in centigrade at 5 minutes, and the pressure was reduced to 1 $kg/cm^2$. The lamination was continuously heated at 80 degrees in centigrade for 12 hours. Upon completion of the hot pressing, the positive/negative collector layers were strongly adhered to the separator layers.

Using the lamination of electrodes and separator, the fourth sample of the film packaged battery was fabricated. The fourth sample was subjected to the excess cycle test without the pack case. The crushed portion and warped portion gradually returned to the initial shapes. When the charge/discharge were repeated certain times close to 200 times, the package started to bulge out, and, thereafter, the gas pressure was increased. When the charge/discharge cycle reached 400, the gas was blown out through the relief valve. However, the charge/discharge cycle capacity was not changed until the gas blow.

Fifth Example

A sample of the fifth example was fabricated as similar to the fourth example except for the clearance between the electrolyte cell and the package. The inner surfaces of the cup were spaced from the electrolyte cell by 2 mm, 0 mm, 2 mm and 0 mm. Using the electrolyte cell, in which the positive/negative collector layers were adhered to the separator layers, the sample of the fifth example was completed. Any crushed portion did not take place. However, the periphery of the upper component part was inwardly warped, and became lower than the transit portions. The fifth sample was subjected to the excess cycle test without the pack case. The warped portion gradually returned to the initial shape, i, e., flat surface. When the charge/discharge were repeated certain times close to 100 times, the package started to bulge out, and, thereafter, the gas pressure was increased. When the charge/discharge cycle reached 200, the gas was blown out through the relief valve. However, the charge/discharge cycle capacity was not changed until the gas blow.

Sixth Example

A sample of the sixth example was fabricated as similar to the fifth example except that the positive/negative collector layers and separator layers were simply laminated without any adhesive compound. The fifth sample was subjected to the excess cycle test without the pack case. The warped portion gradually returned to the initial shape. When the charge/discharge were repeated certain times close to 100 times, the package started to bulge out, and, thereafter, the gas pressure was increased. When the charge/discharge cycle reached 200, the gas was blown out through the relief valve. The charge/discharge cycle capacity was gradually reduced together with the bulging out. When the gas was blown out, the charge/discharge cycle capacity was reduced to 30% of the initial cycle capacity.

Third Comparative Example

The third comparative sample was similar to the second example except for the shape of the cup of the lower component part. The electrolyte cell was snugly received in the cup of the lower component part, and the cup had the depth approximately equal to the height of the electrolyte cell. The transit portions was slightly inner the surface of the upper component part. The other features were similar to those of the second example. The upper component part was not inwardly warped.

The third comparative sample was pinched by the pack case, and was subjected to the excess cycle test. The package immediately started to bulge out. When the charge/discharge cycle reached certain times close to 45 times, the pack case was pushed outwardly due to the internally generated gas, and the package of the third comparative sample was deformed. When the charge/discharge cycle reached 50, the gas was blown out through the relief valve. The charge/discharge cycle capacity was rapidly reduced around $45^{th}$ cycle.

Fourth Comparative Example

The fourth comparative sample was similar to the fourth example except for the shape of the cup of the lower component part. The electrolyte cell was snugly received in the cup of the lower component part, and the cup had the depth approximately equal to the height of the electrolyte cell. The transit portions was slightly inner the surface of the upper component part. The other features such as the adhered electrolyte cell were similar to those of the fourth example. The upper component part was not inwardly warped.

The fourth comparative sample was not pinched by the pack case, and was subjected to the excess cycle test. The package immediately started to bulge out. When the charge/discharge cycle reached 70, the gas was blown out through the relief valve. The charge/discharge cycle capacity was not changed until the gas was blown out.

Comments

Comparing the second example with the third comparative example, it is understood that the space around the electrolyte cell is effective against the gas. Even though the gas was generated in the charge/discharge cycles under the abnormal conditions, the gas was accumulated in the space of the second example, and caused the package of the third comparative example to bulge out in the direction in which the positive/negative collector layers and separators had been laminated. This resulted in the difference in time between the second example and the third comparative example. Since the gas was accumulated in the space around the electrolyte cell, the gas pressure was slowly raised in the package of the second example, and a long time was consumed until the gas blow. The gas pressure immediately started to rise in the package of the third comparative example, and, the time period until the gas glow was short. Moreover, the charge/discharge cycle capacity was not reduced in the second example until the gas blow. However, the charge/discharge cycle capacity was drastically reduced in the third comparative example. This phenomenon is derived from the lost of the tightness between the positive/negative collector layers and the separator layers. When the gas pressure was raised, the difference between the vacuum and the atmospheric pressure was not exerted on the lamination of positive/negative collector layers and separator layers, and the tightness between the positive/negative collector layers and the separator layers was lost. This resulted in the reduction of the charge/discharge cycle capacity. Thus, the second example is more durable and more reliable than the third comparative example.

Comparing the second example with the third example, it is understood that the pack case keeps the charge/discharge cycle capacity prolonged. This was because of the fact that the pack case prevented the lamination of positive/negative collector layers and separator layers from the gas. The pack case kept the positive/negative collector layers and separator layers tightly held in contact with one another after the rise of the gas pressure. Thus, the pack case makes the battery durable.

Comparing the third example with the fourth example, it is understood that the adhesion between the positive/negative collector layers and the separator layers achieve the good durability as similar to the pack case. Thus, the adhesion between the positive/negative collector layers and the separator layers is equivalent to the pack case.

Although the space was removed from around the electrolyte cell of the fifth example, the upper component part was warped. The warped portion of the upper component part offered a space for accumulating the gas. For this reason, the gas was not blown until 200 cycles. When comparing the fourth example with the fifth example, it is understood that the time until the gas blow is dependent on the volume of the space for accumulating the gas.

Both fifth and sixth examples did not have little space around the electrolyte cells. However, the upper component parts were warped due to the difference between the vacuum and the atmospheric pressure. This meant that a little space was available for accumulating the gas. For this reason, the fifth and sixth examples repeated 200 charge/discharge cycles until the gas blow. The fourth example had little space around the electrolyte cell, and any space was not created between the electrolyte cell and the upper component part. This resulted in that the gas was blown at only 70 cycles.

Comparing the fifth example with the sixth example, the adhesion between the positive/negative collector layers and the separator layers was effective against the reduction of the charge/discharge cycle capacity.

Comparing the fourth example with the fourth comparative example, it is understood that the space around the electrolyte cell resulted in the large number of charge/discharge cycles.

Although the excess cycle test was carried out under the abnormal conditions, the durability and reliability are presumable from the test, because it is unavoidable that the battery temporarily operates in the abnormal conditions due to control error of an associated circuit, a large amount of current temporarily generated and shortage of cooling capacity.

The above-described embodiments have the cups, which are larger in volume than the electrolyte cells 111, in one of the component parts of the packages. However, the cups are not limited to those in the embodiments in so far as the space in the component parts is increasable in a direction different from the direction of the lamination of positive/negative collector layers and separator layers. For example, even if a cup has a depth smaller in value than the height of the electrolyte cell, the component part is deformed upon completion of the sealing in vacuum, and the cup achieves the same effects as those cups of the embodiments. Both component parts may be deformed so as to form a cup.

The package may be formed from a single sheet of film or more than two sheets of film. In case where a single sheet of film is used, the single sheet of film is folded up at 180 degrees.

The battery according to the present invention is pinched with the pack case, and the pack case has a frame with poles and the presser plates to be connected to the poles. The battery may be pinched by another force exerting means in so far as the force exerting means has a resiliency or elasticity for exerting the force on the electrolyte cell of the battery in the direction of laminating the positive/negative collector layers and separator layers. The force exerting means may have the resiliency or elasticity. Otherwise, a resilient/elastic member is incorporated in the force exerting means. In case where the battery or batteries are stationary in a building, a pusher may be a part of the building.

Seventh Example

The present inventors fabricated a sample of the seventh example as follows. Powder of lithium manganate with spinel structure, carbonaceous conductivity imparting material and polyvinylidenefluoride were dispersed and blended in NMP (N-methyl-2-oyrrolidone) at weight ratio of 90:5:5. The mixture was agitated so that slurry was obtained. The amount of NMP was regulated in such a manner that the viscosity of the slurry was spread by using a doctor blade. The slurry was uniformly spread over a surface of an aluminum foil of 20 microns thick with the doctor blade for forming a positive collector. While the slurry was being spread, non-coated portions took place like strips. The slurry was dried in vacuum at 100 degrees in centigrade for 2 hours. The slurry was similarly spread on the other surface, and was dried in vacuum. The non-coated portions on the surfaces were overlapped with one another. The aluminum foil coated with the active material was subjected to a roll pressing, and eight rectangular plates were cut from it. The non-coated portions were to be connected to the inner end portions of the lead terminals. Thus, the eight rectangular plates serves as positive collector layers, and formed in combination a positive electrode. The total theoretic capacitance of the positive electrode was 3 Ah.

On the other hand, amorphous carbon powder and polyvinylidenefluoride were dispersed in NMP at weight ratio of 91:9, and the mixture was agitated so as to obtain slurry. The viscosity was regulated in such a manner that the slurry was spread with the doctor blade. The slurry was spread over a surface of copper foil of 10 microns thick with the doctor blade for a negative collector. Non-coated portions took place like stripes. The slurry was dried in vacuum at 100 degrees in centigrade for 2 hours. The thickness of the active material was regulated in such a manner that the theoretic capacitance per unit area on the negative collector and the theoretic capacitance per unit area on the positive collector was 1:1. The slurry was spread over the other surface of the copper foil. The resultant sheet was subjected to the roll pressing, and 9 rectangular plates were cut from the resultant sheet. The nine rectangular plates were longer in both width and length than the eight plates by 2 millimeters. The non-coated portions were to serve as the connected portions to the lead terminal. The nine rectangular plates or nine negative collector layers formed in combination a negative electrode. Thus, the negative electrode was prepared.

The eight positive collector layers were alternated with the nine negative collector layers, and sixteen micro-porous separator layers were inserted between the positive collector layers and the negative collector layers. The micro-porous separator layers were longer in both length and width than the negative collector layers by 2 millimeters. The micro-porous separator layers were manufactured by Hoechst Celanese Corporation, and were sold as Celgard 2300. The negative collector layers were exposed to both outer surfaces of the lamination, and two more separator layers were laminated on the outermost negative collector layers, respectively. The non-coated portions of the positive collector layers were opposed to the non-coated portions of the negative collector layers. Thus, a lamination of positive collector layers and separator layers was obtained for an electrolyte cell.

An aluminum positive lead terminal, which was 0.1 millimeter thick, 50 millimeters wide and 50 millimeters long, was connected to the non-coated portions of the eight positive collector layers by using an ultrasonic welding technique. A nickel negative lead terminal, which was 0.1 millimeter thick, 50 millimeters wide and 50 millimeters long, was connected to the non-coated portions of the nine negative collector layers by using the ultrasonic welding technique. Intermediate portions of the positive/negative lead terminals were wrapped with the sheets of sealant as shown in FIG. 22, and the sheet of sealant were fusion bonded to the intermediate portions.

A sheet of laminate film, which had an aluminum foil of 50 mm thick having both surfaces coated with layers of 8 microns thick made of polyester resin copolymerized from polyethylene terephthalate of 88 weight % and polyethylene isophthalate of 12 weight %, was prepared. A piece of laminate film was cut from the sheet, and was shaped into a laminate film with a cup through a deep drawing. The volume of the cup was 110% of the lamination of positive/negative layers and separator layers. The depth of the cup was equal to the height of the electrolyte cell. The lamination of positive/negative collector layers and separator layers was put in the cup.

Subsequently, liquid electrolyte was injected. The liquid electrolyte was prepared as follows. $LiPF_6$ was dissolved in solvent at 1 mol/litter for producing liquid electrolyte. The solvent contained propylene carbonate and methyl-ethyl carbonate at 50:50 by weight. The amount of injected liquid electrolyte was equivalent to 5 volume % of the electrolyte cell.

A sheet of aluminum was cut out. The sheet of aluminum sheet was a rectangle, and was 100 microns thick. The sheet of aluminum was placed on the laminate film with the cup, and the cup was closed with the aluminum sheet. The aluminum sheet projected from each of the long sides of the laminate film with the cup by 10 millimeters. The aluminum sheet was fold back along virtual lines 10 millimeters from the both sides, and both side portions of the laminate film with the cup were sandwiched in both side portions of the aluminum sheet as similar to those shown in FIG. 19. The sample was inverted.

The sheets of sealant were prepared as follows. Gas barrier resin was nylon, which was produced through polycondensation between metaxylenediamine and adipic acid. The nylon was referred to as "MX nylon". The MX nylon of 20 weight % was blended with polyethylene terephthalate of 80 weight %, and was formed into a sheet of resin of 30 microns thick. In detail, the MX nylon and polyethylene terephthalate were fused, and were blended. The blended resin was formed into pellets. The pellets were put into a uniaxial extruder, and the sheet of resin was obtained through a T-die method. Polyester resin was prepared through co-polymerization between polyethylene terephthalate of 88 weight % and polyethylene isophthalate of 12 weight %, and was formed into a resin sheet of 8 microns thick. The polyester resin served as a metal adhesive layer. The resin sheet containing the MX nylon served as the gas barrier layer, and was fusion bonded to the metal adhesive layer. The sheets of sealant had been inserted between the aluminum plate and the peripheral portions of the laminate film with the cup before bending the peripheral portions.

The fold-up portions of the aluminum plate were heated to 300 degrees in centigrade by using a heater. The sheets of sealant were fused, and the fused sealant was spread over the boundaries between the laminate film with the cup and the aluminum plate. The fused sealant was solidified, again. Thus, the electrolyte cell was sealed in the cup.

In detail, using a seal attachment, which had two copper plates of 0.5 millimeter thick and 12 millimeters wide, the portions to be sealed were clipped by means of the elastic force of springs. The clipped state was as similar to that shown in FIG. 26. One of the copper plates was formed with dents of 0.1 millimeter deep, and the lead terminals passed therethrough. Though not shown in the drawings, the seal attachment had contact portions, which were brought into contact with the portions to be sealed, and the contact portions were coated with fluorine-contained resin so as to prevent the contact portions from adhesion to the portions to be sealed. The heater was pressed to the outer surfaces of the seal attachment, and the seal attachment and the sealant in the portions to be sealed were heated to 320 degrees in centigrade. The width of the sealed portions was 10 millimeters at the transit portions and the remaining portions. The positive lead terminal was firstly sealed, and thereafter, the negative lead terminal was sealed by using a vacuum sealing machine.

When the fused sealant was solidified, the seal attachment was removed from the battery. The sample was exposed to the atmospheric pressure. The atmospheric pressure was exerted on the package, and the package was partially deformed, because the space defined in the cup was larger in volume than the electrolyte cell. When gas was Internally generated, the deformed portion was recovered, and the gas was accumulated.

The sealing method using the seal attachment and the partial deformation of the package, which has the cup larger in volume than the electrolyte cell, by virtue of the differential pressure are available for other batteries, which have packages made of polyolefine series such as polyethylene, polypropylene and modified resin thereof. Various modifications of the seal attachment are available for the batteries in so far as the following conditions are fulfilled. The lead terminals are clipped at the transit portions of the end portions coated with heat fusible resin. Metal members, which are to be brought into contact with the transit portions, are detachably connected thereto, and are heated to or over the fusing point of the resin. The seal attachment is expected to serve as the metal members. For this viewpoint, copper or aluminum is desirable for the seal attachment. The sealed potions are continuously clipped with the seal attachment, and are certainly bonded to each other. The transit portions are also clipped with the seal attachment so that the seal attachment was preferably formed with the dents. Since the heater is pressed to the outer surfaces of the seal attachment, it is preferable that the outer surfaces are coated with separating layers such as silicone resin, fluorine-contained resin or glass-cloth contained resin.

The sample of the seventh example was retained by a pack case as similar to that shown in FIG. 27. The pack case had presser plates as wide as the upper/bottom surfaces of the electrolyte cell. The presser plates were connected through poles to a frame. Although the pack case show in FIG. 27 has the presser plates each connected to the frame through a single pole, the presser plate was connected to the frame by 2×2 poles. The pack case including the presser plates was made of polyester resin. The frame was resiliently deformed so that the presser plates were pressed through the package to the electrolyte cell.

The present inventors fully charged the sample, and gradually raised the temperature around the sample to 210 degrees in centigrade. The sealed portions were maintained, and the electrolyte was never leaked from the package. Thus, the package maintained the inner space in vacuum by virtue of the sealant superior in gas barrier property and heat-resistance.

The present inventors inverted the sample, and made the cup downwardly directed. The present inventors fully charged the Inverted sample, and gradually raised the temperature in the similar manner to the non-inverted sample. The sealed portions were maintained, and any leakage was not observed.

Eighth Example

A sample of the eighth example was fabricated as similar to the seventh example except that the MX nylon was replaced with polyethylene naphthalate. The sample was subjected to the high-temperature test as similar to the seventh example, and the inverted sample was also subjected to the high-temperature test. Any leakage was not observed in both non-inverted and inverted sample. Thus, the eighth sample exhibited good gas barrier capability and heat resistance.

Fifth Comparative Example

The present inventors fabricated a sample of the fifth comparative example. A laminate plate, in which an aluminum foil of 50 millimeters thick was coated with modified polypropylene layers of 8 microns thick on both surfaces thereof, was formed with a cup. The sealant at the transit portions and the sheets of sealant between the component parts were made from a polypropylene layer of 30 microns thick and a modified polypropylene layer of 8 microns thick fusion bonded to the polypropylene layer. Other features were same as those of the seventh example.

The fifth comparative example was retained by the pack case 208 shown in FIG. 27. The pack case had the presser plates as wide as the upper/bottom surfaces of the electrolyte cell, and the presser plates were connected through the poles to the frame. The pack case 208 was made of polyester resin. The frame was resilient, and pressed the presser plates through the package to the electrolyte cell.

The present inventors charged the fifth comparative example, and raised the temperature around the fifth comparative example to 210 degrees in centigrade. When the temperature reached about 170 degrees, a small amount of electrolyte was leaked through the transit portions. This was because of the fact that the sealant was poor in gas barrier property. The present inventors inverted the fifth comparative sample, and carried out the high temperature test. The electrolyte was also leaked through the transit portions around 170 degrees in centigrade.

Evaluation of Sealant

The three sorts of sealant used in the seventh and eighth examples and the fifth comparative example, which were the polyethylene terephthalate/MX nylon blending layer, the polyethylene terephthalate/polyethylene naphthalate blending layer and the polypropylene/modified polypropylene blending layer, were subjected to a test for measuring a coefficient of oxygen permiability. The test was carried out in compliance with ASTM D3985 and JIS K7126. The coefficient of oxygen permeability was 1:8:80.

From the above-described tests, it is understood that the seventh and eighth examples withstood the high temperature ambience at more than 200 degrees in centigrade without any leakage of the electrolyte. However, the seal was broken around 170 degrees in centigrade in the fifth comparative example. The seventh and eighth examples were enhanced in gas barrier property so that the packages kept the inner spaces in vacuum. Thus, the seventh and eight examples were durable and highly reliable.

As will be appreciated from the foregoing description, the batteries based on the first to fourth concept of the present invention are durable and highly reliable.

The battery based on the first concept prevents the transit portions from the exposure to the electrolyte, and the seal at the transit portions is free from the attack of the electrolyte. The transit portions hardly peel off from the lead terminals so that the battery is durable and highly reliable.

The battery based on the second concept of the present invention has the lead terminals projecting in the directions opposite to each other. It is possible to pile up the batteries in such a manner that the positive lead terminal of each battery is overlapped with the negative lead terminals of the battery or batteries at the lower/upper position or positions. As a result, the batteries are connected in series without large resistance. The stacked batteries have the cups downwardly directed, and the electrolyte is hardly leaked from the packages. Thus, the battery based on the second concept is conducive to the reduction of serial resistance, enhancement of productivity and enhancement of resistance against the leakage.

The film packaged battery based on the third concept of the present invention has the deformed film package expandable in a direction different from the direction of the lamination of positive/negative collector layers and separator layers. Even when gas is internally generated, the deformed portion is recovered to the initial shape, and offers the gas accumulating space. For this reason, the film package keeps the inner gas pressure lower than the atmosphere, and the seal is maintained for a long time period. Thus, the film packaged battery on the basis of the third concept is durable and highly reliable.

In case where the deformed portion initially bulges out, the bulge portion is crushed or retracted from the surface of the non-bulge portion. When gas is internally generated, the crushed or retracted portion is recovered to the bulge portion at a relatively small amount of gas internally generated, and offers a wide space for accumulating the gas.

In case where the cup is larger in volume than the electrolyte cell, the cup, in which vacuum has been developed, is crushed, and the deformed portion is easily obtained.

In case where the positive/negative collector layers and separator layers are pressed to one another or adhered to one another, the positive/negative collector layers are held in tight contact with the separator layers against the internally generated gas so that the electrolyte cell is not reduced in electric power generating capability.

In case where the battery pinched by the retainer has the deformed portion, the positive/negative collector layers are held in tight contact with the separator layers against the internally generated gas, and the deformed portion is recovered to the initial shape so as to accumulate the gas. The gas accumulating space keeps the gas pressure low for a long time period, and the electrolyte cell continuously generates a large amount of electric power by virtue of the tight contact between the positive/negative collector layers and the separator layers.

The non-aqueous electrolyte battery based on the fourth concept of the present invention had the layers of gas-barrier sealant, and the gas barrier sealant keeps the boundaries between the component parts of the package tightly sealed at the high temperature ambience at more than 200 degrees in centigrade. Thus, the non-aqueous electrolyte battery based on the fourth concept is durable and highly reliable.

Although particular embodiments of the present invention have been shown and described, it will be apparent to those skilled in the art that various changes and modifications may be made without departing from the spirit and scope of the present invention.

What is claimed is:

[1. A film packaged battery comprising:

a film package made of an expandable material and having a cup portion defining a space and a deformable portion expandable in a first direction, said deformable portion extending into said space when said space is lower in pressure than an ambience around said battery, and said deformable portion recovering to an initial shape when gas is generated in said package;

an electrolyte cell having electrodes laminated in a second direction different from said first direction, received in said space and sealed in said film package, and terminals having respective inner portions electrically connected to said electrolyte cell and respective outer portions projecting to the outside of said film package.]

[2. The film packaged battery as set forth in claim 1, wherein said deformable portion outwardly projects from an outer surface of said film package therearound when the pressure in said space is higher than the pressure of said ambience.]

[3. The film package battery as set forth in claim 2, in which said deformable portion was formed after said cup portion wider in bottom area than said electrolyte cell had been formed in said film package, said formed cup portion having said initial shape.]

[4. The film packaged battery as set forth in claim 2, in which said deformable portion was retracted when vacuum was developed in said space, and the development of said vacuum was carried out after said cup portion was formed in said film package.]

[5. The film packaged battery as set forth in claim 2, in which said film package is separable into two sheets of film or a sheet of foldable film, and said deformable portion is formed in one of said two sheets or a part of said foldable film.]

[6. The film packaged battery as set forth in claim 4, in which said film package is separable into two sheets of film or a sheet of foldable film, and said deformable portion is formed in one of said two sheets or a part of said foldable film.]

[7. The film packaged battery as set forth in claim 5, in which said deformable portion was formed by using a deep drawing.]

[8. The film packaged battery as set forth in claim 6, in which said cup portion was formed by using a deep drawing.]

[9. The film packaged battery as set forth in claim 5, in which said two sheets or two parts of said foldable sheet are bonded to each other in said space in such a manner as to be resistive against an expansion of said space in said another direction.]

[10. The film packaged battery as set forth in claim 1, in which said electrolyte cell has a coil-like shape.]

[11. The film packaged battery as set forth in claim 1, in which said electrolyte cell includes plural plates adhered to one another.]

[12. The film packaged battery as set forth in claim 1, in which said electrolyte cell includes plural plates, and a retainer keeps said plural plates held in tight contact with one another.]

[13. The film packaged battery as set forth in claim 12, in which said retainer is a piece of adhesive tape adhered to said plural plates.]

[14. The film packaged battery as set forth in claim 1, in which said electrolyte cell includes non-aqueous electrolyte.]

[15. The film packaged battery as set forth in claim 12, wherein said retainer presses said plural plates to one another.]

[16. A film packaged battery comprising:

a film package made of an expandable material and having a cup portion defining a space, said cup having walls expandable in a first direction, said walls having an inwardly extending dent or bulge that extends into said space when said space is lower in pressure than an ambience around said battery and outwardly expands when the pressure in said space is higher than the pressure of said ambience;

an electrolyte cell having laminated electrodes received in said space and sealed in said film package; and terminals having respective inner portions electrically connected to said electrolyte cell and respective outer portions projecting outside of said film package.]

*17. A film packaged battery, comprising:*

*an electrolyte cell having laminated electrodes;*

*a film package sealing said electrolyte cell;*

*terminals having respective inner portions electrically connected to said electrolyte cell and respective outer portions projecting to an outside of said film package; and*

*a pair of presser plates pinching said electrolyte cell via said film package intervening therebetween so as to press said laminated electrodes into their laminated direction,*

*wherein said film package is made of an expandable material and includes:*

*a cup portion defining a space, in which said electrolyte cell is received, and*

*a deformable portion, which is formed in a part of said film package where said film package is not in contact with said electrolyte cell, extending into said space opposite to an initial shape when said space is lower in pressure than an ambient pressure around said battery, and bulging out toward said initial shape when gas is generated in said package.*

*18. The film packaged battery as set forth in claim 17, wherein portions of said film package in contact with said presser plates do not bulge out when gas is generated in said package.*

*19. The film packaged battery as set forth in claim 17, wherein said deformable portion outwardly projects from an outer surface of said film package therearound as said initial shape.*

*20. The film package battery as set forth in claim 19, wherein said cup portion is wider than an area in contact with said electrolyte cell and said presser plates, and said deformable portion is provided at a part of the wider portion of said cup portion.*

*21. The film packaged battery as set forth in claim 19, wherein said deformable portion is retractable into said space when said space is lower in pressure than the ambient pressure around said battery.*

*22. The film packaged battery as set forth in claim 19, wherein said film package is separable into two sheets of films or a sheet of a foldable film, and*

*said deformable portion is formed in one of said two sheets or a part of said foldable film.*

*23. The film packaged battery as set forth in claim 20, wherein said film package is separable into two sheets of films or a sheet of a foldable film, and*

*said deformable portion is formed in one of said two sheets or a part of said foldable film where said cup portion is formed.*

*24. The film packaged battery as set forth in claim 19, wherein said film package is formed from a laminate film comprising a metal foil and a resin sealing layer, and said deformable portion is formed from deep drawing said laminate film.*

*25. The film packaged battery as set forth in claim 20, wherein said film package is formed from a laminate film comprising a metal foil and a resin sealing layer, and said cup portion and said deformable portion are formed from deep drawing said laminate film.*

*26. The film packaged battery as set forth in claim 17, in which said electrolyte cell has a coil shape.*

*27. The film packaged battery as set forth in claim 17, wherein a plurality of said electrodes in said electrolyte cell are adhered to one another.*

*28. The film packaged battery as set forth in claim 17, wherein said electrolyte cell further includes a retainer to keep a plurality of said electrodes held in tight contact with one another.*

*29. The film packaged battery as set forth in claim 28, in which said retainer is a piece of adhesive tape adhered to said plurality of said electrodes.*

*30. The film packaged battery as set forth in claim 17, in which said electrolyte cell includes non-aqueous electrolyte.*

*31. The film packaged battery as set forth in claim 17, wherein said deformable portion bulges out until recovering said initial shape.*

*32. The film packaged battery as set forth in claim 17, wherein said terminals include respective intermediate portions passing through the boundary between upper and lower parts of said film package and are bent so as to raise the outer and intermediate portions of said terminal over the upper surface of said electrolyte cell, and*

*the upper parts of said film package are inwardly warped when said space is lower in pressure than the ambient pressure around said battery, and the portions of said*

*film package on both sides of the upper presser palate bulge out when gas is generated in said package.*

*33. A film packaged battery comprising:*

*a film package made of an expandable material and having a cup portion defining a space, said cup portion having walls expandable in a first direction, said walls having an inwardly extending dent or bulge that extends into said space when said space is lower in pressure than an ambient pressure around said battery and outwardly expands when the pressure in said space is higher than the ambient pressure;*

*an electrolyte cell having laminated electrodes received in said space and sealed in said film package;*

*terminals having respective inner portions electrically connected to said electrolyte cell and respective outer portions projecting outside of said film package; and*

*a pair of presser plates pinching said electrolyte cell via said film package intervening therebetween so as to press said laminated electrodes into their laminated direction.*

*34. The film packaged battery as set forth in claim 33, wherein portions of said film package in contact with said presser plates do not bulge out when gas is generated in said package.*

*35. A film packaged battery assembly comprising:*

*a film package battery, which comprises:*

*an electrolyte cell having laminated electrodes, sealed in a film package, and*

*terminals having respective inner portions electrically connected to said electrolyte cell and respective outer portions projecting to the outside of said film package; and*

*a pack case, which comprises:*

*a pair of presser plates pinching said electrolyte cell via said film package intervening therebetween so as to press said laminated electrodes into their laminated direction a frame constituting an outer of the pack case; and*

*a pole connected between the frame and respective presser plates,*

*wherein said film package is made of an expandable material and includes:*

*a cup portion defining a space, in which said electrolyte cell is received; and*

*a deformable portion, which is formed in a part of said film package where said film package is not in contact with said electrolyte cell and said presser plates, extending into said space opposite to an initial shape when said space is lower in pressure than an ambience around said battery, and*

*there is bulging out toward said initial shape when gas is generated in said package.*

*36. The film packaged battery assembly as set forth in claim 35, wherein portions of said film package in contact with said presser plates do not bulge out when gas is generated in said package.*

* * * * *